US012368942B2

(12) United States Patent
Hendren et al.

(10) Patent No.: US 12,368,942 B2
(45) Date of Patent: Jul. 22, 2025

(54) CAMERA INTEGRATION FOR PORTABLE ELECTRONIC DEVICES

(71) Applicant: Apple Inc., Cupertino, CA (US)

(72) Inventors: Keith J. Hendren, Santa Cruz, CA (US); Adam T. Garelli, Morgan Hill, CA (US); Alex J. Lehmann, Redwood City, CA (US); Dinesh C. Mathew, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/749,836

(22) Filed: Jun. 21, 2024

(65) Prior Publication Data
US 2024/0422414 A1 Dec. 19, 2024

Related U.S. Application Data

(63) Continuation of application No. 17/659,621, filed on Apr. 18, 2022, now Pat. No. 12,052,484.

(51) Int. Cl.
H04N 23/00 (2023.01)
H04N 23/45 (2023.01)
(Continued)

(52) U.S. Cl.
CPC ........... *H04N 23/531* (2023.01); *H04N 23/45* (2023.01); *H04N 23/51* (2023.01); *H04N 23/951* (2023.01)

(58) Field of Classification Search
CPC ...... H04N 23/531; H04N 23/45; H04N 23/51; H04N 23/951; H04N 23/55; H04N 23/57;
(Continued)

(56) References Cited

U.S. PATENT DOCUMENTS

| 4,907,296 A | 3/1990 | Blecha |
| 5,856,811 A | 1/1999 | Shih et al. |

(Continued)

FOREIGN PATENT DOCUMENTS

| CN | 1573531 A | 2/2005 |
| CN | 109076117 A | 12/2018 |

(Continued)

OTHER PUBLICATIONS

Anderson, Mona, "How to Use Two Cameras at the Same Time on iPhone", AppleToolBox [online], Available at: appletoolbox.com/use-two-cameras-same-time-on-iphone/ [Accessed Oct. 13, 2022], Sep. 9, 2020.

(Continued)

*Primary Examiner* — Frank F Huang
(74) *Attorney, Agent, or Firm* — Dorsey & Whitney LLP

(57) ABSTRACT

A portable electronic device can have a housing including a wall, the wall at least partially defining an external surface, and the housing defining an aperture disposed opposite the wall. A display assembly can be positioned at the aperture and a retention component can be positioned at least partially in an internal volume defined by the housing. The portable electronic device can also have an optical component that includes an optical component housing defining a camera aperture and a camera module positioned at the camera aperture. The optical component can be configured to be removably retained against the wall by the retention component and to be removably retained against the display assembly by the retention component.

19 Claims, 21 Drawing Sheets

Related U.S. Application Data

(60) Provisional application No. 63/261,333, filed on Sep. 17, 2021, provisional application No. 63/180,202, filed on Apr. 27, 2021.

(51) Int. Cl.
  *H04N 23/51* (2023.01)
  *H04N 23/53* (2023.01)
  *H04N 23/951* (2023.01)

(58) Field of Classification Search
  CPC ..... H04N 23/50; G06F 1/1616; G06F 1/1637; G06F 1/1686; G06F 1/1605; H04M 1/0264
  See application file for complete search history.

(56) References Cited

U.S. PATENT DOCUMENTS

| | | | |
|---|---|---|---|
| 7,288,339 B2 * | 10/2007 | Cho | H01M 4/13 |
| | | | 429/189 |
| 10,347,179 B2 * | 7/2019 | Kim | G09G 3/3266 |
| 10,401,959 B1 | 9/2019 | Fujii et al. | |
| 10,733,437 B2 * | 8/2020 | Weller | G06V 40/19 |
| 10,875,617 B2 * | 12/2020 | Gai | G05D 1/0206 |
| 10,884,273 B1 * | 1/2021 | Xiao | G02F 1/13338 |
| 10,943,085 B2 * | 3/2021 | Cheng | G06V 40/1318 |
| 11,062,117 B2 * | 7/2021 | Liu | G06V 40/1306 |
| 11,768,538 B1 * | 9/2023 | Wang | G06F 3/014 |
| | | | 345/156 |
| 2005/0243191 A1 * | 11/2005 | Itoh | H04N 1/00307 |
| | | | 348/231.99 |
| 2008/0211941 A1 | 9/2008 | Deever et al. | |
| 2010/0046059 A1 * | 2/2010 | McCabe | G02B 5/0858 |
| | | | 359/263 |
| 2013/0106787 A1 * | 5/2013 | Lee | G06F 3/042 |
| | | | 345/175 |
| 2014/0071245 A1 | 3/2014 | Zhang et al. | |
| 2014/0146153 A1 | 5/2014 | Birnkrant et al. | |
| 2014/0225131 A1 | 8/2014 | Benson et al. | |
| 2015/0009550 A1 | 1/2015 | Misago et al. | |
| 2015/0181099 A1 * | 6/2015 | Van Der Tempel | G01S 7/4911 |
| | | | 348/135 |
| 2016/0155472 A1 | 6/2016 | Elg et al. | |
| 2016/0225192 A1 | 8/2016 | Jones et al. | |
| 2016/0283790 A1 * | 9/2016 | Douglas | G06V 10/751 |
| 2017/0007351 A1 | 1/2017 | Yu | |
| 2017/0013192 A1 | 1/2017 | Yang | |
| 2017/0085764 A1 | 3/2017 | Kim et al. | |
| 2017/0094271 A1 * | 3/2017 | Liu | H04N 19/176 |
| 2017/0099479 A1 | 4/2017 | Browd et al. | |
| 2017/0123452 A1 | 5/2017 | Evans et al. | |
| 2017/0181802 A1 | 6/2017 | Sachs et al. | |
| 2017/0220844 A1 * | 8/2017 | Jones | G06F 1/1637 |
| 2017/0322410 A1 | 11/2017 | Watson et al. | |
| 2018/0012007 A1 * | 1/2018 | Kim | G06F 18/00 |
| 2018/0012413 A1 | 1/2018 | Jones et al. | |
| 2018/0048909 A1 * | 2/2018 | Liu | H04N 19/105 |
| 2018/0081093 A1 * | 3/2018 | Wang | G02B 5/0231 |
| 2018/0103260 A1 * | 4/2018 | Chuang | H04N 19/70 |
| 2018/0124394 A1 * | 5/2018 | Xu | H04N 19/573 |
| 2018/0152727 A1 * | 5/2018 | Chuang | H04N 19/70 |
| 2018/0249071 A1 * | 8/2018 | Shiraishi | H04N 7/181 |
| 2019/0254754 A1 | 8/2019 | Johnson et al. | |
| 2019/0258300 A1 | 8/2019 | Gerardi | |
| 2019/0265730 A1 | 8/2019 | Xu et al. | |
| 2019/0324496 A1 | 10/2019 | Cherukkate et al. | |
| 2019/0333448 A1 * | 10/2019 | Kim | H10K 59/123 |
| 2019/0369678 A1 | 12/2019 | Park et al. | |
| 2020/0014780 A1 * | 1/2020 | Jones | H04N 23/54 |
| 2020/0050818 A1 * | 2/2020 | He | G06V 40/45 |
| 2020/0117025 A1 | 4/2020 | Sauer | |
| 2020/0330179 A1 | 10/2020 | Ton | |
| 2020/0380240 A1 * | 12/2020 | Liu | G06V 40/13 |
| 2021/0041917 A1 | 2/2021 | Moon et al. | |
| 2021/0051255 A1 | 2/2021 | Saliev | |
| 2021/0055765 A1 | 2/2021 | Lai et al. | |
| 2021/0067764 A1 | 3/2021 | Shau et al. | |
| 2021/0136284 A1 * | 5/2021 | Gopalakrishna | H04N 23/75 |
| 2022/0345604 A1 | 10/2022 | Hendren et al. | |
| 2023/0290897 A1 * | 9/2023 | Benson | G06F 3/041 |
| | | | 257/82 |

FOREIGN PATENT DOCUMENTS

| | | |
|---|---|---|
| CN | 110557530 A | 12/2019 |
| CN | 110636375 A | 12/2019 |
| CN | 110650294 A | 1/2020 |
| CN | 112153506 A | 12/2020 |
| DE | 212020000169 U1 | 10/2020 |
| GB | 2552090 A | 1/2018 |
| JP | 2000207057 A | 7/2000 |
| JP | 2004145540 A | 5/2004 |
| JP | 2004318843 A | 11/2004 |
| JP | 2005010407 A | 1/2005 |
| JP | 2009092808 A | 4/2009 |
| JP | 2010015015 A | 1/2010 |
| JP | 2010034926 A | 2/2010 |
| JP | 2010160187 A | 7/2010 |
| JP | 2010232828 A | 10/2010 |
| JP | 2010252186 A | 11/2010 |
| JP | 2012205117 A | 10/2012 |
| JP | 2012222471 A | 11/2012 |
| JP | 2016035691 A | 3/2016 |
| JP | 2017048090 A | 3/2017 |
| JP | 2017527833 A | 9/2017 |
| JP | 2017208638 A | 11/2017 |
| JP | 2018525684 A | 9/2018 |
| JP | 2019506765 A | 3/2019 |
| JP | 2020518010 A | 6/2020 |
| JP | 2020188484 A | 11/2020 |
| WO | 2020133161 A1 | 7/2020 |
| WO | 2020163807 A1 | 8/2020 |

OTHER PUBLICATIONS

Coldewey, Devin , "Here's why the iPhone 7 plus has two cameras", TechCrunch [online] Available at: techcrunch.com/2016/09/07/heres-why-the-iphone-7-has-two-cameras/ [Accessed Oct. 13, 2022], Sep. 7, 2016.

Farsace, Becca , "Filmic DoubleTake Lets You Record from Two iPhone Cameras At the Same Time", The Verge [online], Available at: theverge.com/2020/1/28/21083583/filmic-doubletake-ios-app-released-download [Accessed Oct. 13, 2022], Jan. 28, 2020.

Van Camp, Jeffrey , "3D Smartphone Showdown: LG Optimus 3D vs. HTC EVO 3D", digitaltrends [online], Available at: digitaltrends.com/mobile/3d-smartphone-showdown-lg-optimus-3d-vs-htc-evo-3d [Accessed Oct. 13, 2022], Apr. 6, 2011.

* cited by examiner

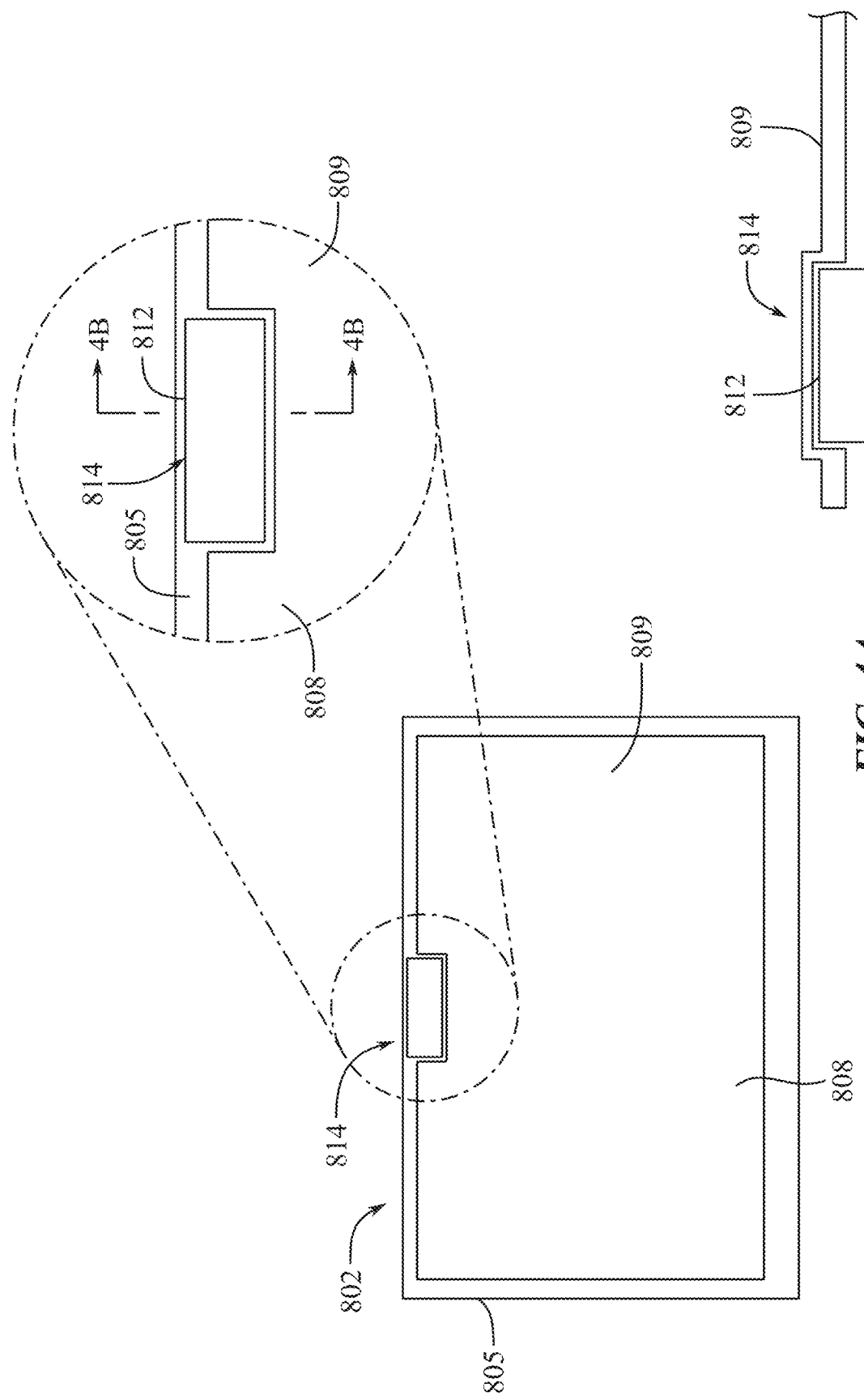

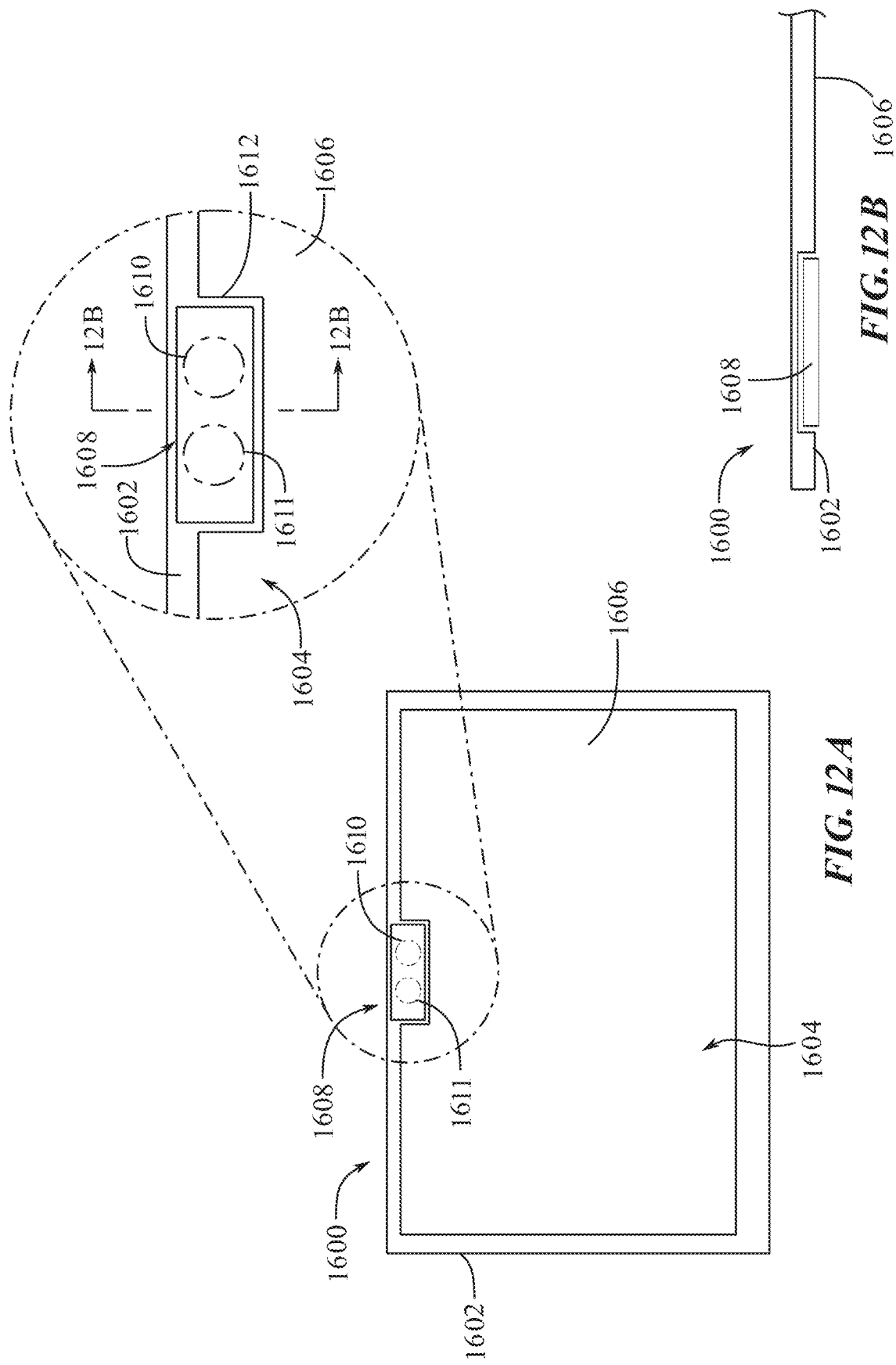

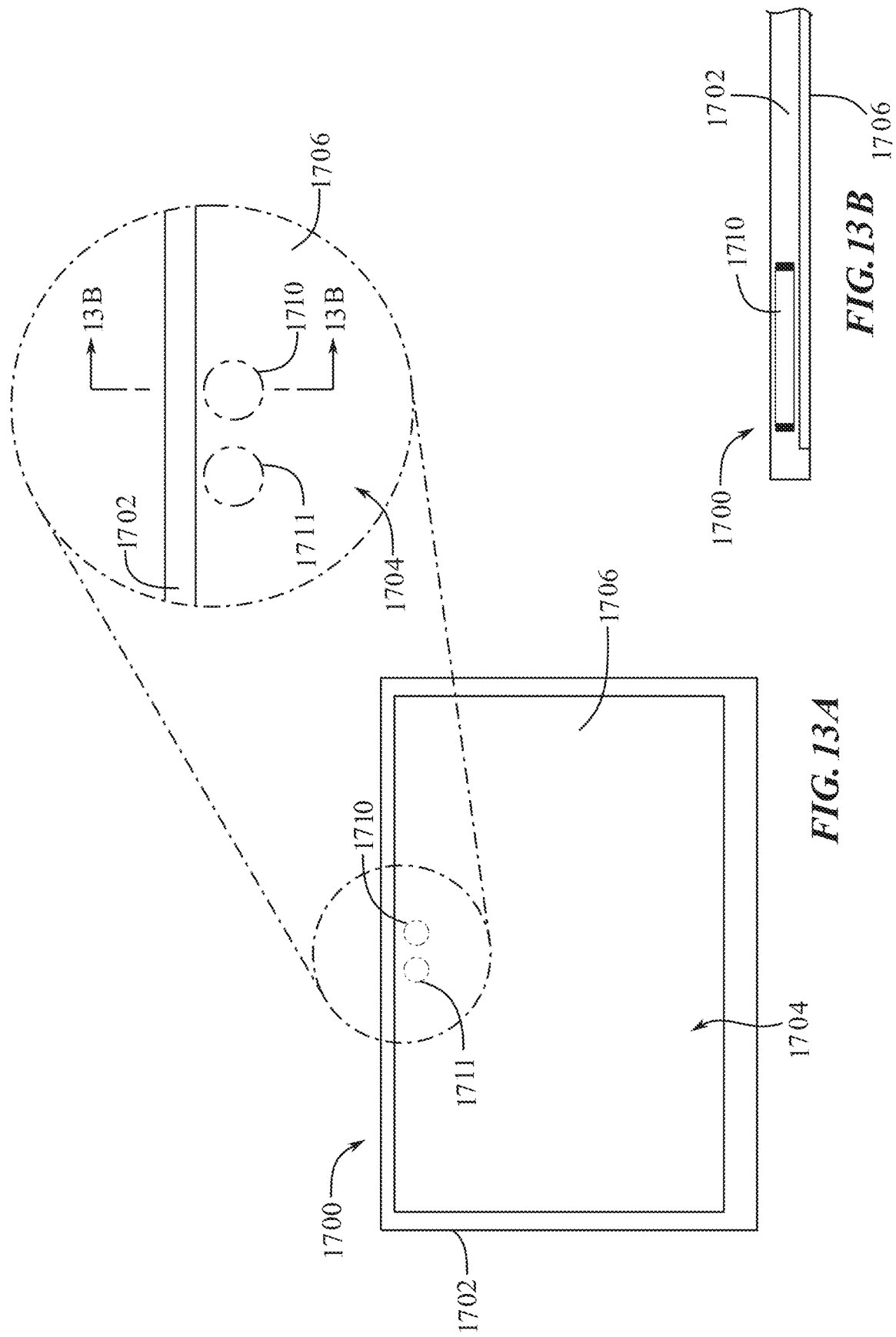

CAMERA INTEGRATION FOR PORTABLE ELECTRONIC DEVICES

CROSS-REFERENCE TO RELATED APPLICATIONS

This application claims the benefit of U.S. Provisional Patent Application No. 63/261,333, filed Sep. 17, 2021, entitled "CAMERA INTEGRATION FOR PORTABLE ELECTRONIC DEVICES," U.S. Provisional Patent Application No. 63/180,202, filed Apr. 27, 2021, entitled "CAMERA INTEGRATION FOR PORTABLE ELECTRONIC DEVICES," and U.S. Non Provisional patent application Ser. No. 17/659,621, entitled "CAMERA INTEGRATION FOR PORTABLE ELECTRONIC DEVICES," the disclosures of which are incorporated herein by reference in their entireties.

FIELD

The described embodiments relate generally to components for an electronic device. More particularly, the present embodiments relate to components and structures for electronic devices including cameras and displays.

BACKGROUND

The components of an electronic device, for example, a housing of an electronic device and associated components, can include structures having features tailored to the specific purposes for which they are employed. The components can be configured to provide physical support or protection to other components of the electronic device, provide for thermal transmission, provide for airflow through or around the electronic device, or provide for any number of additional purposes. The components of the electronic device can be designed to provide a unique and pleasing look and feel to a user. Additionally, the components can be designed to optimize one or more dimensions of the device, such as an amount of active area of the device.

Recent advances in electronic devices have enabled high levels of performance. Existing components, structures, desired geometries, and methods of assembly for electronic devices, however, can limit the levels of performance of such devices. For example, traditional housings can limit the amount or relative percentage of active area of a display, or the available volume for use by optical components. Similarly, traditional methods of device assembly can include features or components that inhibit device performance, even when non-traditional housing structures are used. Further, traditional structures and methods used to assemble an electronic device can undesirably limit one or more dimensions of the device relative to the individual dimensions of each component. In this regard, further tailoring of components for electronic devices can provide additional or enhanced functionality, desired dimensions, and pleasing aesthetic features.

SUMMARY

According to some aspects of the present disclosure, a portable electronic device can include a housing including a wall, the wall at least partially defining an external surface, and the housing defining an aperture disposed opposite the wall. A display assembly can be positioned at the aperture. A first camera module can be disposed within an internal volume defined by the housing. A second camera module can be positioned within the internal volume. A processor can be disposed within the housing and electrically connected to the first camera module and the second camera module. The processor can be configured to receive a first set of image data from the first camera module. The processor can be configured to receive a second set of image date from the second camera module. The processor can be configured to combine the first set of image data and the second set of image data to generate a third set of image data.

In some examples, the portable electronic device can further include an optical component. The first camera module and the second camera module can be collocated within the optical component. The display assembly can define a notch and the optical component can be at least partially disposed at the notch. In some examples, the first camera module and the second camera module can be each disposed between the wall and an active region of the display assembly. The first camera module can be configured to operate at a different frame rate from a frame rate of the second camera. In some examples, an overall thickness of the first camera module can be different from an overall thickness of the second camera module. The overall thickness of the first camera module can be about 3 mm or less. The overall thickness of the second camera module can be about 3 mm or less. The first set of image data and the second set of image data can be combined using machine learning techniques.

According to some aspects, a portable electronic device can include a base portion including an input component, a display portion rotatably attached to the base portion, the display portion including a display portion housing defining an aperture. The display portion housing can include a protrusion positioned at a perimeter region of the aperture, the protrusion at least partially surrounding a display portion volume. A display assembly can be positioned at the aperture, a camera module can be positioned in an internal volume defined by the protrusion that is adjacent to the display portion volume, and a component can be positioned in the display portion volume.

In some examples, the component includes a radiating element of an antenna. The component can include an audio component. The component can include a structural lattice. The protrusion can extend around the entire perimeter region of the aperture. The camera module can receive light passing through an active area of the display assembly. For example, the display assembly can include an organic light-emitting diode (OLED) display panel, an array of low-power micro light emitting diodes (LED), a combination thereof, or any other display technology. The camera module can be a first camera module and the display portion can also include a second camera module collocated with the first camera module within the internal volume. The first camera module and the second camera module can be disposed within an optical component at least partially positioned at a notch defined by the display assembly.

According to some aspects, a portable electronic device can include a base portion including an input component and a display portion rotatably attached to the base portion, the display portion including a display portion defining an aperture and an internal volume. The display portion housing can include a wall positioned opposite the aperture, the wall defining a planar surface and a protrusion. A display assembly can be positioned at the aperture, and a sensor assembly can be disposed in a portion of the internal volume defined by the protrusion and the display assembly. The sensor assembly can include a camera module positioned to receive light passing through the display assembly, and a sensor module positioned to detect one or more properties of an ambient environment opposite an active surface of the display assembly.

In some examples, the camera module is positioned to receive light passing through an active area of the display assembly. The sensor assembly can be positioned adjacent to a central region of the active area of the display assembly. The camera module can be a first camera module and the sensor module can include a second camera module. The sensor module can include a LiDAR module. In some examples, the portable electronic device can further include a processor disposed within the housing. The processor can be electrically connected to the first camera module and the second camera module. The processor can be configured to receive a first set of image data from the first camera module. The processor can be configured to receive a second set of image date from the second camera module. The processor can be configured to combine the first set of image data and the second set of image data to generate a third set of image data.

BRIEF DESCRIPTION OF THE DRAWINGS

The disclosure will be readily understood by the following detailed description in conjunction with the accompanying drawings, wherein like reference numerals designate like structural elements, and in which:

FIG. 4A shows a front view of a portion of an electronic device.
FIG. 4B shows a cross-sectional view of a portion of an electronic device.
FIG. 12A shows a front view of a portion of an electronic device.
FIG. 12B shows a cross-sectional view of a portion of an electronic device.
FIG. 13A shows a front view of a portion of an electronic device.
FIG. 13B shows a cross-sectional view of a portion of an electronic device.

DETAILED DESCRIPTION

Figure 1:
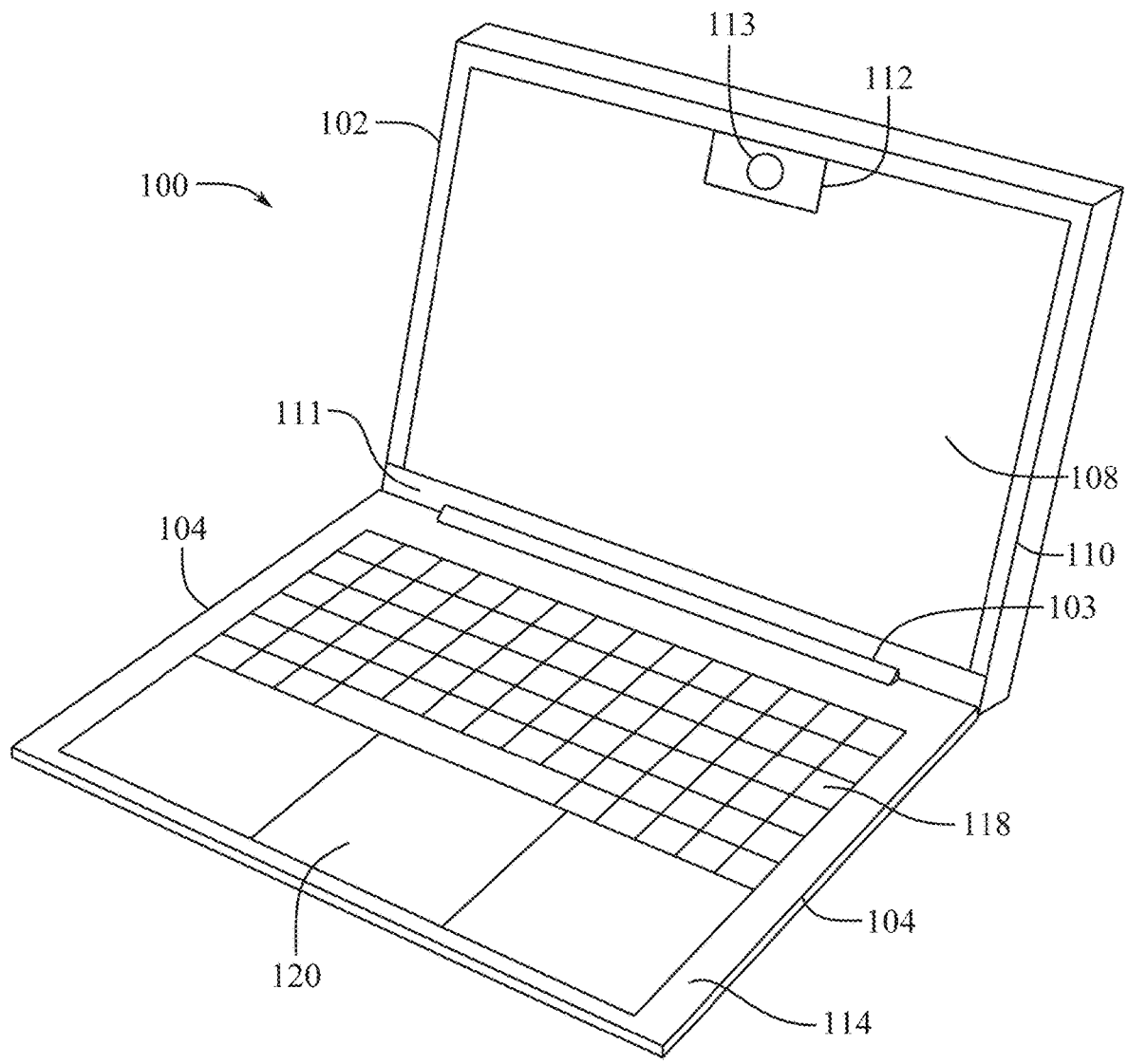
FIG. 1 shows a perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The architecture and components of the electronic devices, including display portions, described herein, can allow for configurations of an electronic device that can maximize the active area of a display or display cell in a display portion, while still providing visual access to one or more components of the device that may need to be positioned at the display portion facing a user to achieved desired levels of functionality. In traditional electronic device configurations, such as with traditionally designed laptops that include a user-facing camera, the display portion can include a relatively large region or bezel above the active area of the display cell that can extend across an entire width of the display portion to house the camera. Additionally, traditional laptop display portion designs can include relatively large bezels around most or all of the periphery of the display cell to hide components for mounting the display cell to the display portion housing, for example, components that can fix the position of the display cell in one or more directions relative to the display housing.

In contrast, the components, features, and configurations described herein can allow for display portion designs that maximize the user-facing active area of the display, while minimizing or even eliminating the bezels adjacent to the display cell, all while maintaining the same or even improved levels of display performance. For example, the display portions described herein can have relatively small or even no bezel area around at least two edges or sides of a display cell. In some examples, an electronic device can include one or more user-facing components, such as a camera and an ambient light sensor, that can be positioned at an edge of the display, but that may not require a bezel or inactive region that extends across an entire dimension of the display. In other words, the user facing component can be disposed behind or under the screen such that each user facing component can receive light passing through an active area of the display. In some examples, the user-facing components can be moveable and/or removable relative to the display.

In the description herein, the terms "first portion," "display portion," and "upper portion" can refer to a lid portion of a computing device. Generally, a lid portion of a computing device is configured to be in a substantially upright position for a user to view a display housed in the lid portion while the device is being operated. In some examples, however, the lid portion can assume any desired position relative to the base portion. In the description below, the terms "second portion," "main housing," "base portion," and "lower portion" can refer to a base of a computing device that can be moveably affixed to the lid portion, and that generally includes connections to input components for user interaction with the computing device.

These and other embodiments are discussed below with reference to FIGS. 1-13B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a front-facing perspective view of an electronic device 100. The electronic device 100 can be a laptop computer or a notebook computer, but this is merely one representative example of a device according to the present disclosure. The electronic device 100 can, for example, correspond to a portable media player, a media storage device, a portable digital assistant ("PDA"), a tablet computer, a computer, a mobile communication device, a GPS unit, a remote control device, and other similar electronic devices. The electronic device 100 can be referred to as an electronic device, or a consumer device. The electronic device 100 can include a housing having a base portion 104, which can be moveably, pivotally, or rotatably connected or affixed to a display portion 102, for example, by way of a hinge assembly 103. The display portion 102 and the base portion 104 can be referred to as different sections or portions of a single housing of the electronic device 100. The display portion 102 can pivot or otherwise move with respect to the base portion 104 from a closed position to an open position, and back again with the aid of the hinge assembly 103. Although illustrated as being pivotally attached to the base portion 104, in some examples, the display portion 102 can move in any manner desired relative to the base portion 104. For example, the display portion 102 can slide laterally relative to the base portion 104. In some examples, the display portion 102 can move in any combination of directions relative to the base portion 104. For example, the display portion 102 can be rotated relative to the base portion 104, and/or can slide laterally relative to the base portion 104.

In the closed position, the display portion 102 can be positioned substantially on top of or over at least a portion of a top surface 114 of the base portion 104. In some examples, the display portion 102 can directly contact the top surface 114 of the base portion 104. In some examples, the display portion 102 can be substantially parallel to the top surface 114 of the base portion 104 when in the closed position. In the open position, the display portion 102 can be positioned at an angle relative to the top surface 114 of the base portion, for example, generally perpendicular to the top surface 114 of the base portion 104. In some examples, in an open position, the display portion 102 and the base portion 104 can form a generally obtuse angle. In some examples, the electronic device 100 can still be considered to be in an open position when an angle of less than 90 degrees is formed between the display portion 102 and the base portion 104.

In some examples, the base portion 104 can include various user input devices such as a keyboard 118 and a touchpad 120, which can, for example, receive touch or other finger gesturing input from a user. In some examples, one or more of the input components 118, 120 can at least partially define the top surface 114, and can at least partially be positioned in an aperture or apertures defined by the base portion 104. The base portion 104 and the display portion 102 can each define internal volumes, chambers, or cavities that house internal components of the electronic device 100. The display portion 102 can further define an aperture or an opening and can include a display 108 disposed therein. In some examples, the display portion 102 can include a rear housing, rear wall, or a rear cover 107 that can be disposed opposite the aperture and/or the display 108. Thus, the display portion 102 and the base portion 104 can function as housings for internal components.

The display 108 can be any form of display, component, or device used to display visual content to a user. For example, the display 108 can be a light-emitting diode (LED) display, an organic light-emitting diode (OLED) display, a liquid-crystal display (LCD) display, a micro-LED display, or the like. In some examples, the display 108 can be any form of display now known in the art, or as may be developed in the future. In some examples, the display 108 can be a touch screen display, or can have touch detecting capabilities. In some examples, however, the electronic device can be capable of detecting a user's touch, and/or a position of an appendage of the user, by components other than the display 108. In some examples, the display portion 102 can also include one or more user-facing components, such as an optical component, or visual component 112, that can be disposed at a notch defined by one or more components of the display 108. In some examples, the optical component 112 can include a camera module 113. In some examples, the camera module 113 can be used as a user-facing camera. However, as described herein, in some examples, the optical component 112 can include multiple camera modules, or the same camera module 113 can be used as a user-facing and/or non-user-facing camera module 113. Further details of the electronic device 100 are provided below with reference to FIGS. 2A-2C.

Figure 2A:
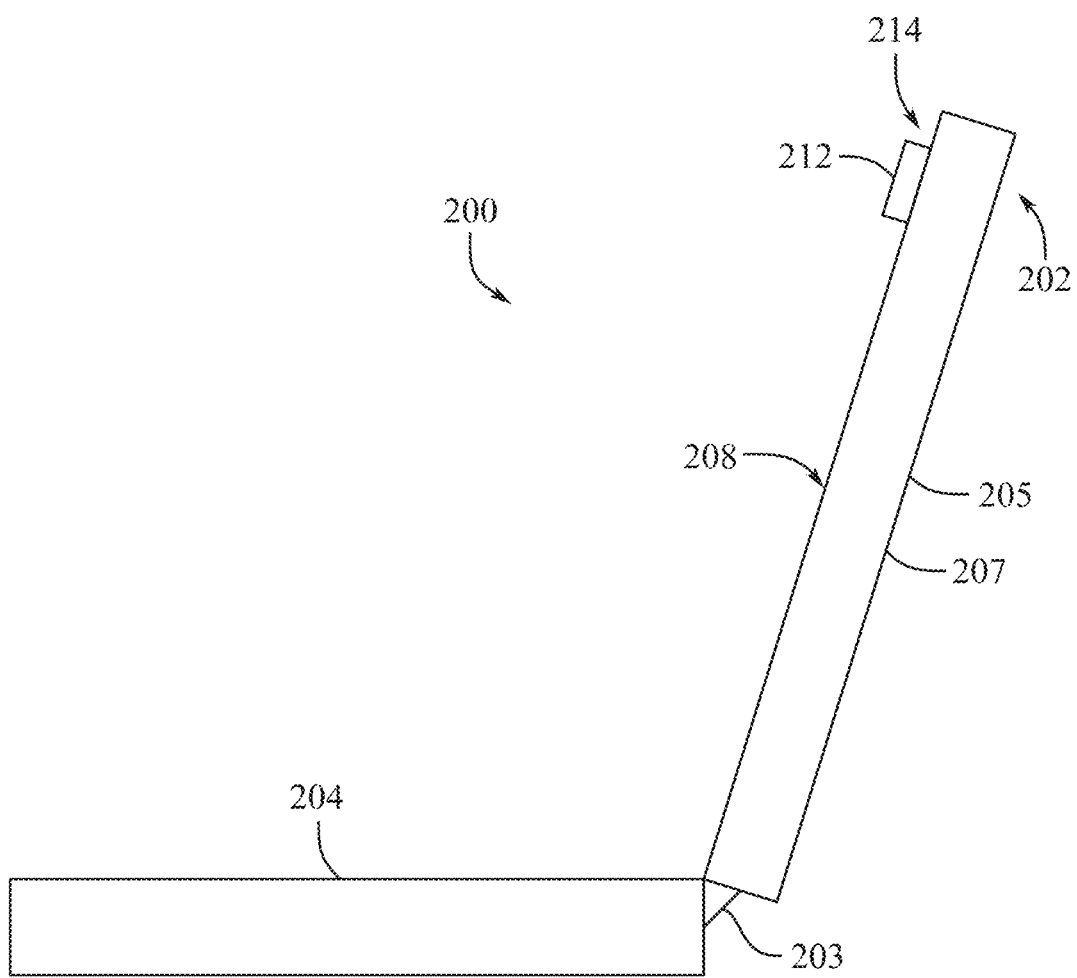
FIG. 2A shows a side view of an electronic device.

FIG. 2A illustrates a side view of an electronic device 200. The electronic device can be substantially similar to and can include some or all of the features of any of the electronic devices described herein, such as electronic device 100. In some examples, the display portion 202 can include a display housing 205 that can at least partially define an internal volume and a display 208 that can be at least be partially disposed in the internal volume and affixed or secured to the display housing 205. The device 200 can also include a base portion 204, and the base portion 204 and display portion 202 can be rotatably or otherwise moveably or removably attached to one another by a connecting component 203. In some examples, the connecting component 203 can include a hinge, although substantially any form of connecting component or components 203 can be used.

In some examples, and as described with respect to FIG. 1, the electronic device 200 can include an optical component or sensor assembly 212. The optical component or sensor assembly 212 can include any of the features, components, or subcomponents of any of the other optical components and/or sensor assemblies described herein. As shown in FIG. 2A, the display portion 202 can include a display portion housing 205 that can define an aperture in which the display assembly 208 is positioned. The display portion housing 205 can further include a wall 207 that can be disposed opposite the aperture and the display assembly 208. In some examples, the display portion housing 205 can further include a protrusion 214 or an optical component housing. The protrusion 214 can extend away from a planar surface of the wall 207 and can be adjacent or near a periphery of the display assembly 208. In some examples, the protrusion 214 can extend out of a plane defined by the display assembly 208. In some examples, the protrusion 214 can at least partially define the internal volume of the display assembly. Although, in some examples, the protrusion can define a protrusion volume that can be isolated or separated from the internal volume defined by the display portion housing 205. In either case, in some examples, the optical component 212 can be at least partially positioned with the protrusion volume or the portion of the internal volume defined by the protrusion 214.

In this way, the components, parts, or subcomponents of the optical component 212 can be located in a desirable position relative to the display assembly 208, such as near or adjacent an active surface thereof, while allowing for a relatively small or thin cross-sectional area of the rest of the display portion housing 205. Further, in some examples, the base portion 204 can define a recess, cut-out, indentation, or other feature that can be shaped to correspond to a shape of the protrusion 214 in order to allow for the display portion 202 to be positioned flush with the base portion 204 when the electronic device 200 is in a closed position.

Figure 2B:
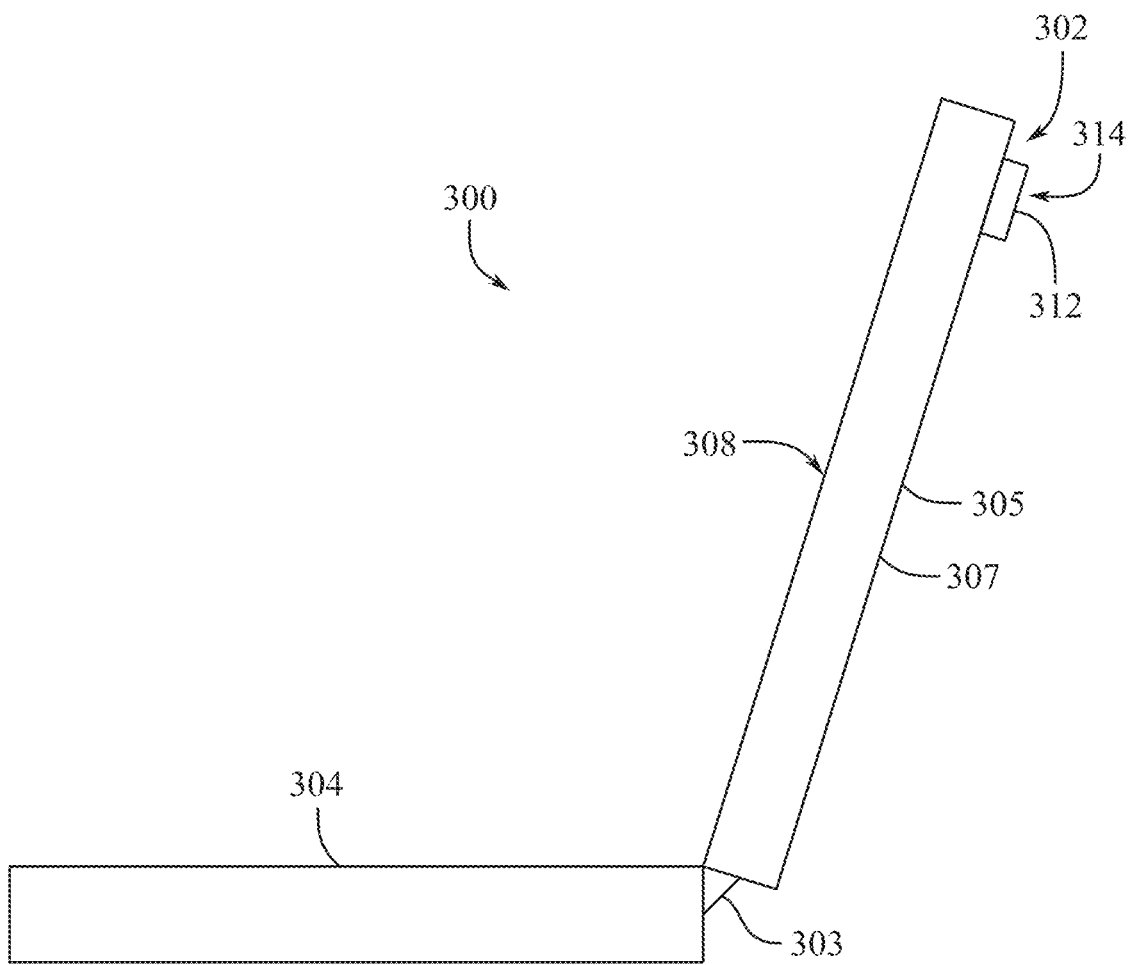
FIG. 2B shows a side view of an electronic device.

FIG. 2B shows a side view of an electronic device 300 that can be substantially similar to, and can include, some or all of the features of the electronic devices described herein, including electronic device 200. The electronic device 300 can include a display portion 302 including a display housing 305 that can at least partially define an internal volume, and a display 308 that can be at least partially disposed in the internal volume and affixed or secured to the display housing 305. The device 300 can also include a base portion 304, and the base portion 304 and the display portion 302 can be rotatably or otherwise moveably or removably attached to one another by a connecting component 303. The display portion housing 305 can include a substantially planar back wall 307 that can be positioned opposite the display assembly 308. In some examples, the display portion housing 305 can further include a protrusion 314 that can extend from a plane defined by the wall 307 of the display portion housing 305.

In the example shown in FIG. 2B, the protrusion 314 can extend from the plane defined by the wall 307 in a direction away from the display assembly 308 and/or the aperture defined by the display portion housing 305 containing the display assembly 308. As with electronic device 200, the optical component 312 can be contained in a protrusion volume and/or a portion of the internal volume defined by the protrusion 314. This configuration can allow for the display portion 302, including the display assembly 308, to be positioned flush or substantially flush or level with the base portion 304 in a closed configuration, while still providing adequate internal volume to contain the optical component 312.

Figure 2C:
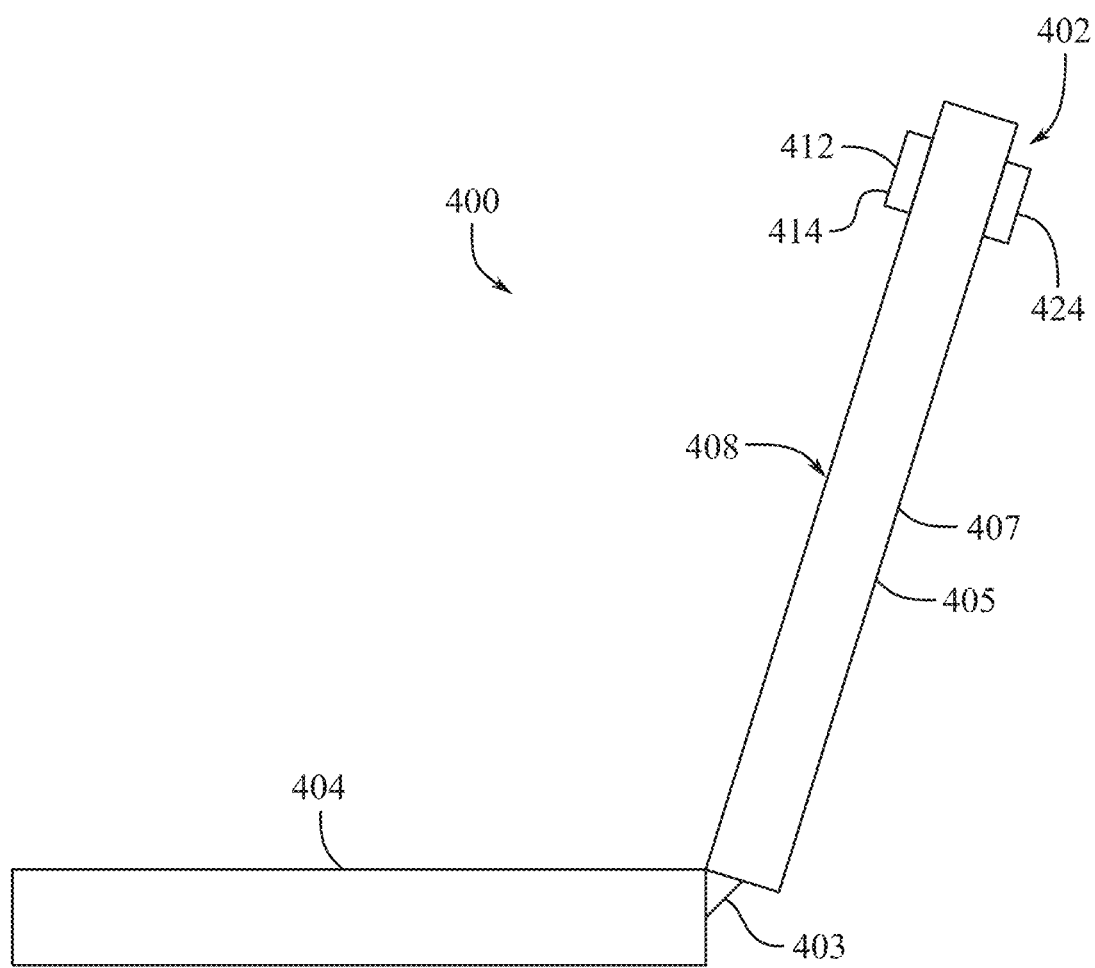
FIG. 2C shows a side view of an electronic device.

FIG. 2C shows a side view of an electronic device 400 that can be substantially similar to, and can include, some or all of the features of the electronic devices described herein, including electronic device 400. The electronic device 400 can include a display portion 402 that can include a display housing 405 that can at least partially define an internal volume, and a display 408 that can be at least partially disposed in the internal volume and affixed or secured to the display housing 405. The device 400 can also include a base portion 404, and the base portion 404 and display portion 402 can be rotatably or otherwise moveably or removably attached to one another by a connecting component 403. The display portion housing 405 can include a wall 407 that can be positioned opposite the display assembly 408.

As described with respect to FIG. 2A, the display portion housing 405 can include a first protrusion 414 that can extend away from a planar surface of the wall 407 and can be adjacent or near a periphery of the display assembly 408. In some examples, the protrusion 414 can extend out of a plane defined by the display assembly 408. Further, in some examples, the display portion housing 405 can also include a second protrusion 424 that can extend from the plane defined by the wall 407 in a direction away from the display assembly 408 and/or the aperture defined by the display portion housing 405 containing the display assembly 408.

In some examples, the portions of the internal volume and/or protrusion volumes defined by the first protrusion 414 and the second protrusion 424 can be in communication with one another and/or with the portion of the internal volume defined by the rest of the display portion housing 405. In some other examples, however, either or both of the protrusion volumes defined by the first protrusion 414 and the second protrusion 424 may not be in communication with one another or the internal volume defined by the display portion housing 405. As with other electronic devices described herein, the optical component 412 can be positioned in an internal volume or protrusion volume at least partially defined by the first protrusion 414 and/or the second protrusion 424. Additionally, although the first protrusion 414 and the second protrusion 424 are illustrated as being disposed in line with and opposite from one another on the display portion housing 405, it should be noted that either of the first protrusion 414 and the second protrusion 424 can be positioned at any location on the display portion housing 405 and need not align with one another. Thus, in some examples where the first protrusion 414 and the second protrusion 424 are positioned at laterally distinct positions on the display portion housing 405, some parts or subcomponents of the optical component or sensor assembly 412 can be positioned in a volume defined by the first protrusion 414, and some other parts or subcomponents of the optical component 412 can be positioned in the volume defined by the second protrusion 424.

Figure 3A:
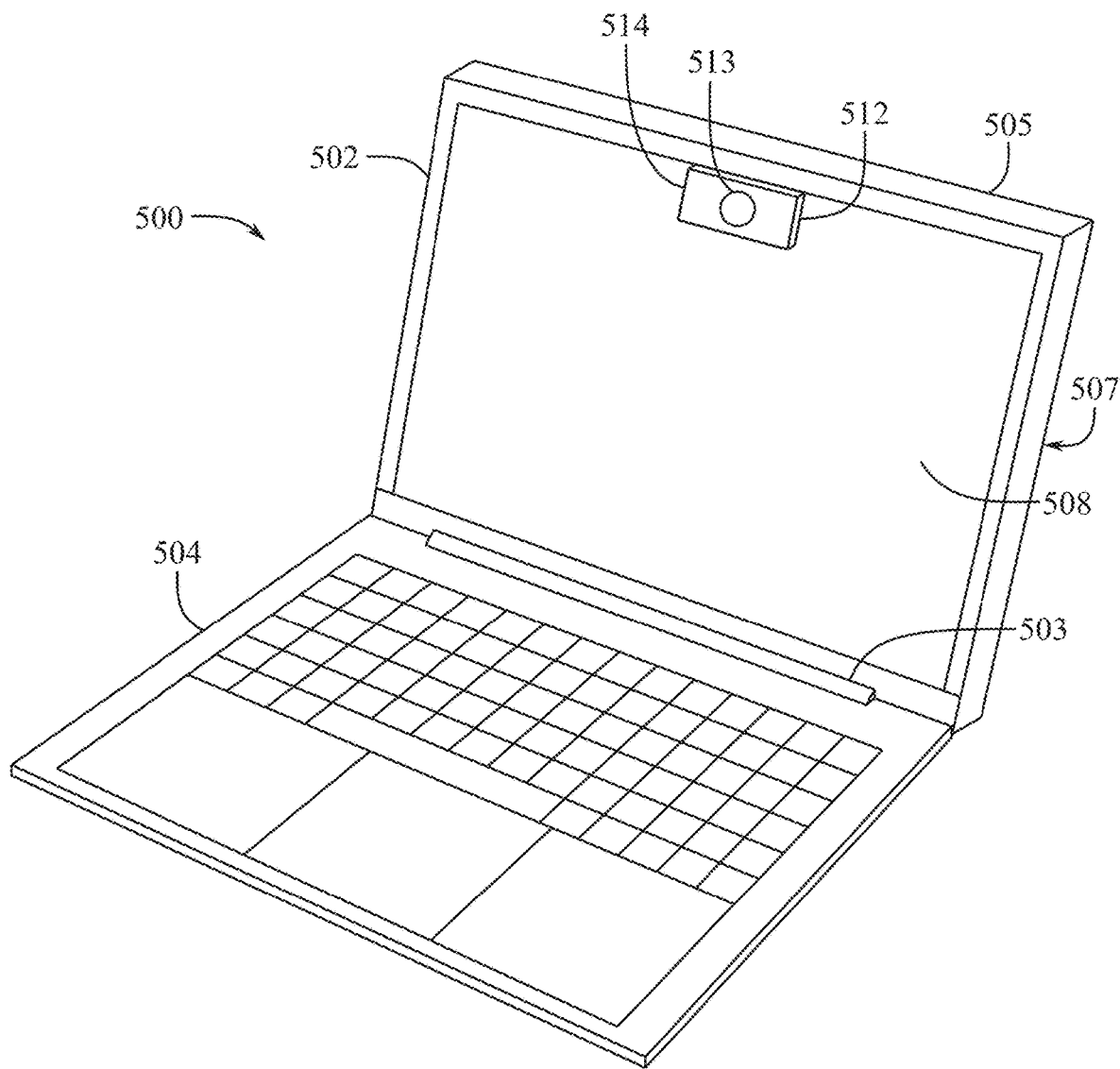
FIG. 3A shows a perspective view of an electronic device.

FIG. 3A shows a perspective view of an electronic device 500 that can be substantially similar to, and can include, some or all of the features of the electronic devices described herein, including electronic devices 200 and 400 as shown in FIGS. 2A and 2C. As with electronic devices 200 and 400, the electronic device 500 can include a display portion 502 that can include a display housing 505 that can at least partially define an internal volume, and a display 508 that can be at least partially disposed in the internal volume and affixed or secured to the display housing 505. The device 500 can also include a base portion 504, and the base portion 504 and the display portion 502 can be rotatably or otherwise moveably or removably attached to one another by a connecting component 503. The display portion housing 505 can include a wall 507 that can be positioned opposite the display assembly 508, and a protrusion 514 that can contain an optical component 512 at least partially positioned therein.

As shown, the optical component 512 can include at least one camera 513, and can be positioned substantially adjacent to the active area of the display assembly 508. In the present example, the active area of the display assembly 508 can have a recessed, notched, or indented region at the location of the protrusion 514. In this way, the active area of the display assembly 508 can at least partially surround the protrusion 514 and/or optical component 512. For example, the active area of the display assembly 508 can surround two or more sides of the protrusion 514 and/or optical component 512. Further, the camera 513 of the optical component can be a user-facing camera and can face in a same general direction as the active area of the display assembly 508. Accordingly, the camera 513 can function as a user-facing camera during, for example, a video call.

Figure 3B:
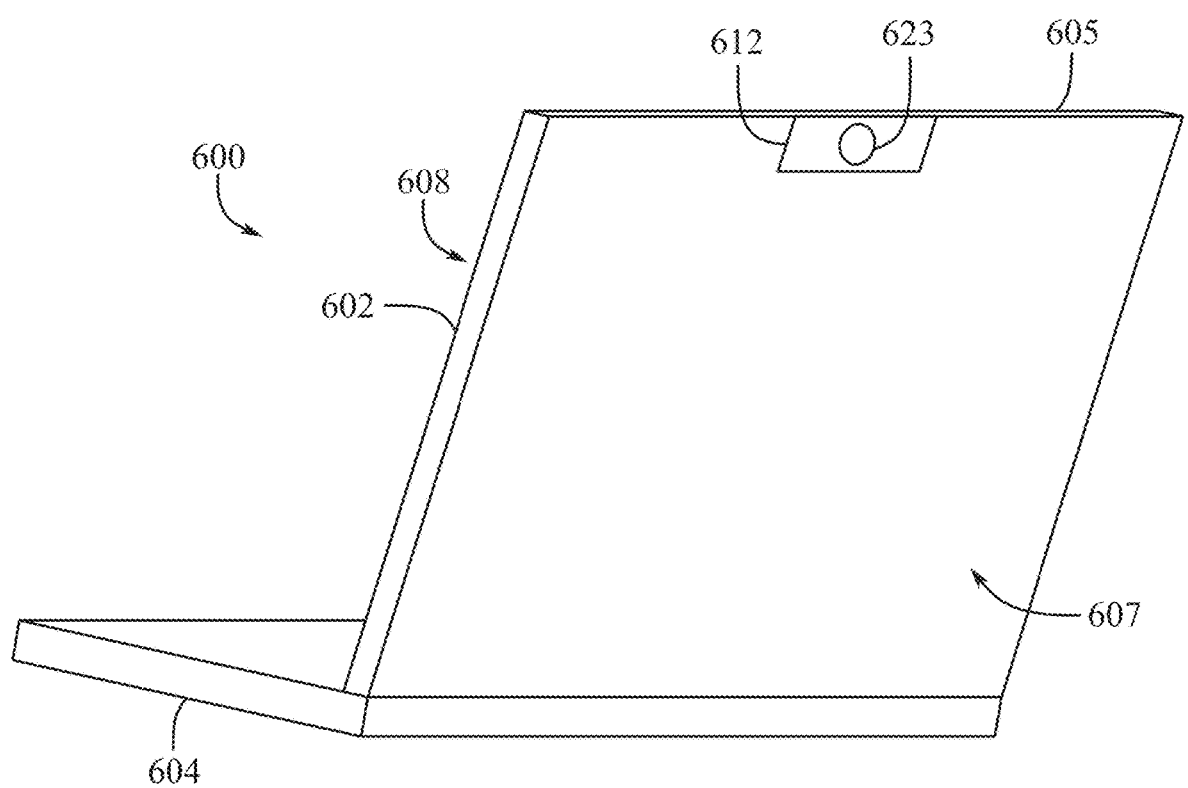
FIG. 3B shows a rear perspective view of an electronic device.

FIG. 3B shows a perspective view of an electronic device 600 that can be substantially similar to, and can include, some or all of the features of the electronic devices described herein, including electronic device 500 as shown in FIG. 3A. As with electronic device 500, the electronic device 600 can include a display portion 602 that can include a display housing 605 that can at least partially define an internal volume, and a display 608 that can be at least partially disposed in the internal volume and affixed or secured to the display housing 605. The device 600 can also include a base portion 604, and the base portion 604 and display portion 602 can be rotatably or otherwise moveably or removably attached to one another by a connecting component. The display portion housing 605 can include a wall 607 that can be positioned opposite the display assembly 608.

In some examples, the device 600 can include an optical component 612 that can be substantially similar to the optical component 512 described with respect to FIG. 3A, and that can be positioned in a volume defined by a protrusion (not shown) of the display housing 605. In addition to a user-facing camera similar to the user-facing camera 513 described with respect to FIG. 3A, the optical component 612 can also include a second camera 623. In some examples, the second camera 623 can be positioned or oriented to face a different direction than another camera of the optical component 612. For example, a first camera of the optical component 612 can be user-facing and the second camera 623 can face in the opposite direction. In this way, the second camera 623 can be used to provide image data relating to the environment behind the display assembly 608.

Figure 3C:
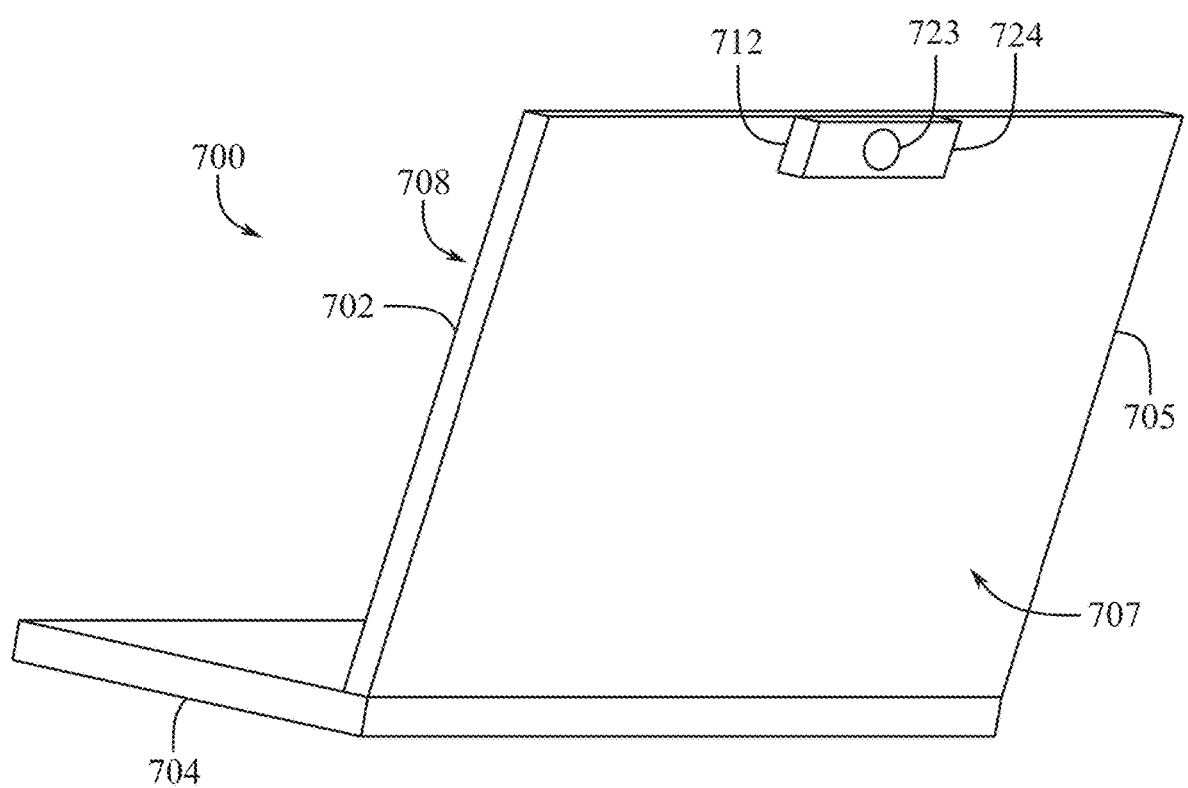
FIG. 3C shows a rear perspective view of an electronic device.

FIG. 3C shows a rear perspective view of an electronic device 700 that can be substantially similar to, and can include, some or all of the features of the electronic devices described herein, including electronic device 500 as shown in FIG. 3A. As with electronic device 500, the electronic device 700 can include a display portion 702 that can include a display housing 705 that can at least partially define an internal volume, and a display 708 that can be at least partially disposed in the internal volume and affixed or secured to the display housing 705. The device 700 can also include a base portion 704, and the base portion 704 and display portion 702 can be rotatably or otherwise moveably or removably attached to one another by a connecting component. The display portion housing 705 can include a wall 707 that can be positioned opposite the display assembly 708, and a protrusion 724 that can contain an optical component 712 at least partially positioned therein, for example, as described with respect to FIGS. 2B and 2C.

In some examples, the device 700 can include an optical component 712 that can be substantially similar to the optical component 712 described with respect to FIG. 3A and that can be positioned in a volume defined by a protrusion 724 of the display housing 705. In addition to a user-facing camera similar to the user-facing camera 513 described with respect to FIG. 3A, the optical component 712 can also include a second camera 723. In some examples, the second camera 723 can be positioned to face a different direction than another camera of the optical component 712. For example, a first camera of the optical component 712 can be user-facing, and the second camera 723 can face in the opposite direction. In this way, the second camera 723 can be used to provide image data relating to the environment behind the display assembly 708.

Although described herein as including a second camera 723, it should be understood that the optical component 712 can include any number and/or type of sensors in addition to, or in place of, any of the cameras described herein. Accordingly, the second camera 723 can include a sensor module, such as an infrared camera, a time-of-flight camera, a light detection and ranging (LiDAR) module, facial recognition sensor or sensors, object recognition sensor or sensors, or any other sensor or sensors as desired. Similarly, a first user-facing camera of any of the optical components described herein, including optical components 512 and 612 can include any number or type of sensor as desired, such as an infrared camera, a time-of-flight camera, a LiDAR module.

Any number or variety of components in any of the configurations described herein can be included in the electronic device. The components can include any combination of the features described herein, and can be arranged in any of the various configurations described herein. The structure and arrangement of components of an electronic device having a housing with structures described herein, and defining an internal volume, as well as the concepts regarding optical components and associated protrusions and/or housings, can apply not only to the specific examples discussed herein, but to any number of embodiments in any combination. Various embodiments of electronic devices including components having various features in various arrangements are described below, with reference to FIG. 4.

FIG. 4A shows a front view of a display portion 802 of an electronic device that can be substantially similar to, and can include, some or all of the features of the electronic devices described herein. The display portion 802 can be substantially similar to any of the display portions described herein, and can include at least a display portion housing 805 defining an internal volume and an aperture in which a display assembly 808 can be positioned. In some examples, the display portion can include a transparent cover layer 809 that can overlay the display assembly 808, including an active area thereof. In some examples, the transparent cover layer 809 can be considered part of the display assembly 808 and/or the display housing 805. The transparent cover layer 809 can substantially occlude, block, or seal the aperture defined by the display portion housing 805. In some examples, a top or exterior surface of the transparent cover layer 809 can be flush or even with an exterior surface defined by the display portion housing 805.

In some examples, the display portion 802 can include a protrusion 814 that can be substantially similar to, and can serve the same or similar functions as the protrusions described with respect FIGS. 1-3C. That is, as shown in the inset view, the protrusion 814 can at least partially define a volume that can contain an optical component 812.

FIG. 4B illustrates a cross-sectional view of the display portion 802 of FIG. 4A, including the transparent protective cover 809. As can be seen, the transparent cover layer 809 can include the protrusion 814, and can at least partially define the volume containing the optical component 812. In some examples, the transparent cover layer 809 can include any transparent material as desired, including polymeric material, glass, ceramic, and/or combinations thereof. In some examples, the transparent cover layer 809, including the protrusion 814, can be formed from a single or unitary portion of transparent material. That is, the transparent cover layer 809 can include a planar portion that overlies the display assembly 808 and a protrusion portion 814 that overlies and/or contains the optical component 812. The protrusion 814 can define a portion of the exterior surface of the transparent cover layer 809 that can be offset from the planar portion. In some examples, the transparent cover layer 809 can include fused glass and can be cut, milled, machined, or otherwise subtractively manufactured to achieve the described structure. In some examples, however, the transparent cover layer 809 can be formed by any process as desired, including any combination of additive and/or subtractive processes.

Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding optical components and associated protrusions and/or housings, can apply not only to the specific examples discussed herein, but to any number of embodiments in any combination. Various embodiments of electronic devices including components having various features in various arrangements are described below, with reference to FIGS. 5-7.

Figure 5:
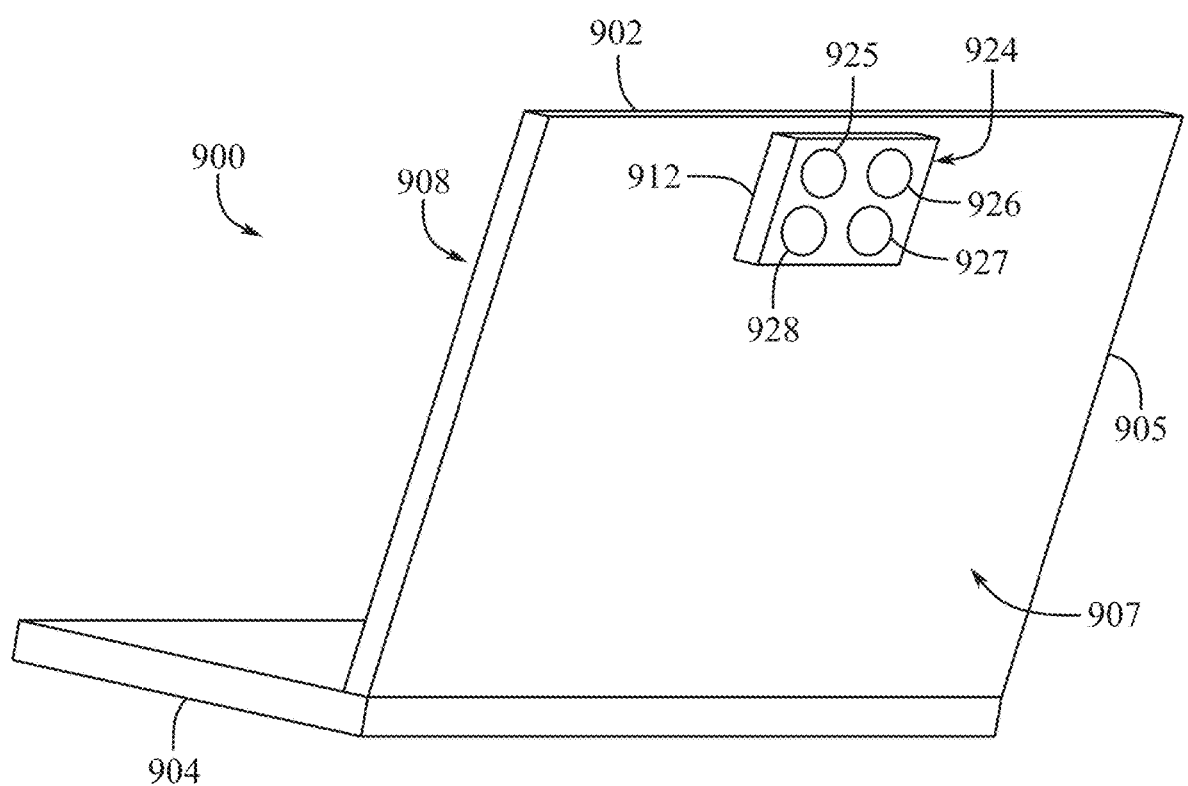
FIG. 5 shows a rear perspective view of an electronic device.

FIG. 5 shows a perspective view of an electronic device 900 that can be substantially similar to, and can include some or all of the features of the electronic devices described herein. The electronic device 900 can include a display portion 902 that can include a display housing 905 that can at least partially define an internal volume, and a display 908 that can be at least partially disposed in the internal volume and affixed or secured to the display housing 905. The device 900 can also include a base portion 904, and the base portion 904 and display portion 902 can be rotatably or otherwise moveably or removably attached to one another by a connecting component. The display portion housing 905 can include a wall 907 that can be positioned opposite the display assembly 908.

In some examples, the display housing 905 can include a protrusion 924 that can be substantially similar to the protrusions described herein, including the protrusion 724 described with respect to FIG. 3C. That is, the protrusion 924 can extend from the plane defined by the wall 907 in a direction away from the display assembly 908 and/or the aperture defined by the display portion housing 905 containing the display assembly 908. The optical component 912 can be contained in a protrusion volume and/or a portion of the internal volume defined by the protrusion 924. In some examples, and as described herein, the optical component 912 can include at least one user-facing camera (not-shown) that can face in a same general direction as an active area of the display assembly 908. For example, the user-facing camera of the optical component 912 can be used to capture an image of a user when the user is viewing the display assembly 908.

Further, as shown in FIG. 5, the optical component 912 can include a number of additional camera and/or sensor modules. The optical component 924 in FIG. 5 is shown as including four camera and/or sensor modules 925, 926, 927, 928, although it should be understood that the optical component 912 can include substantially any number and/or type of camera and/or sensor modules 925, 926, 927, 928. The protrusion 924 and/or the optical component 912 can have substantially any shape as desired. Further, the protrusion 924 can have a shape and/or position that can be independent of any user-facing parts of the optical component 912 and/or a user-facing protrusion or protrusions extending from a plane defined by the display assembly 908.

As described herein, the camera and/or sensor modules 925, 926, 927, 928 can include any type of optical camera, optical sensor, infrared camera, time-of-flight camera, zoom camera module, LiDAR module, radar module, or any other sensor, as desired. In some examples, one or more of the camera and/or sensor modules 925, 926, 927, 928 can include camera modules having different focal lengths. That is, a camera module 925 can have a first focal length or range of focal lengths while a camera module 926 can have a second different focal length or range of focal lengths. Thus, in some examples, the optical component 912 can include any number and/or type of sensors 925, 926, 927, 928 that can detect one or more properties of an ambient environment opposite the active surface of the display assembly 908.

Further, in some examples, one or more of the modules 925, 926, 927, 928 can include an emitter. That is, one or more of the modules 925, 926, 927, 928 can include a module that can emit radiation into the ambient environment. For example, one or more of the modules 925, 926, 927, 928 can include a flash or strobe module, and/or an infrared emitter. In some examples, an emitter module can serve to aid or assist on or more of the sensor modules 925, 926, 927, 928. As in the case where the optical component 912 includes a strobe or flash module, the strobe module can serve to selectively illuminate a region of the ambient environment to allow one or more of the modules 925, 926, 927, 928 to more effectively image the ambient environment.

Figure 6:
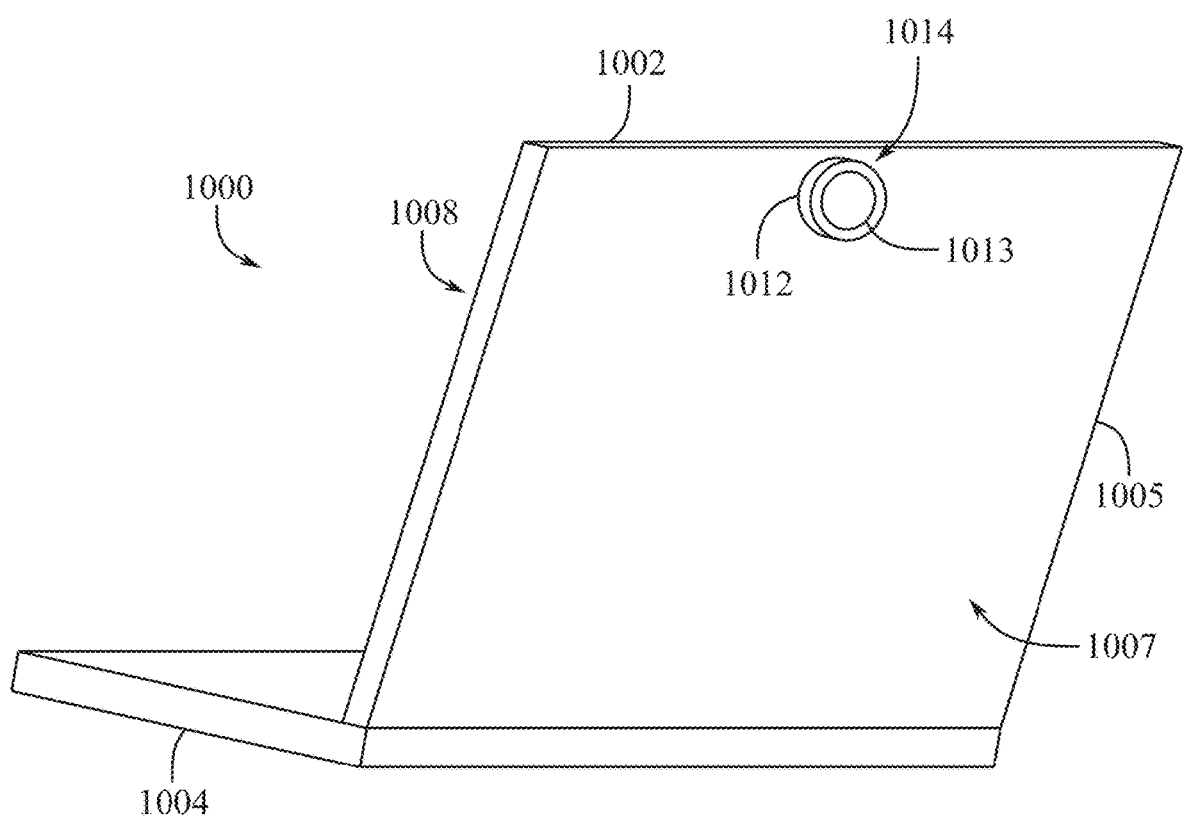
FIG. 6 shows a rear perspective view of an electronic device.

FIG. 6 shows a perspective view of an electronic device 1000 that can be substantially similar to, and can include, some or all of the features of the electronic devices described herein. The electronic device 1000 can include a display portion 1002 that can include a display housing 1005 that can at least partially define an internal volume and a display 1008 that can be at least partially disposed in the internal volume and affixed or secured to the display housing 1005. The device 1000 can also include a base portion 1004, and the base portion 1004 and display portion 1002 can be rotatably or otherwise moveably or removably attached to one another by a connecting component. The display portion housing 1005 can include a wall 1007 that can be positioned opposite the display assembly 1008.

In the present example shown in FIG. 6, the display portion housing 1005 can include a protrusion 1014 that can be substantially a same or similar size as the camera module 1013 of the optical component 1012. That is, in some examples, the protrusion 1014 may be sized to encompass only a single camera module 1013 of the optical component 1012, while any other modules of the optical component 1012 can be positioned in the internal volume defined by the rest of the display housing 1005. Further, in some examples, the protrusion 1014 can effectively be the camera module 1013 or can be part of the camera module 1013.

Figure 7:
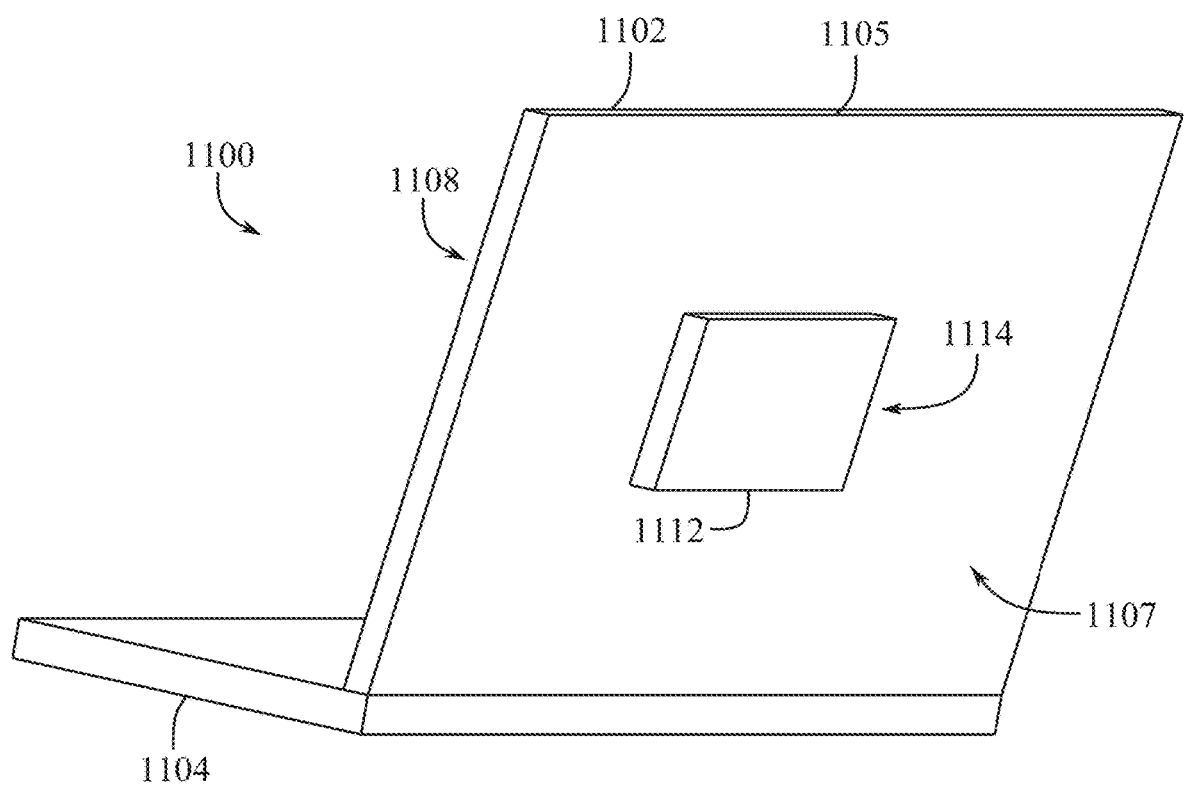
FIG. 7 shows a rear perspective view of an electronic device.

FIG. 7 shows a perspective view of an electronic device 1100 that can be substantially similar to and can include some or all of the features of the electronic devices described herein. The electronic device 1100 can include a display portion 1102 that can include a display housing 1105 that can at least partially define an internal volume and a display 1108 that can be at least partially disposed in the internal volume and affixed or secured to the display housing 1105. The device 1100 can also include a base portion 1104, and the base portion 1104 and display portion 1102 can be rotatably or otherwise moveably or removably attached to one another by a connecting component. The display portion housing 1105 can include a wall 1107 that can be positioned opposite the display assembly 1108.

In some examples, the display portion 1102 can include a user-facing camera (not-shown) that can be positioned adjacent to an active area of the display assembly 1108. In some examples, however, a camera module of the optical component 1112 can be positioned behind the display assembly 1108 in a volume at least partially defined by a protrusion 1114 of the display assembly housing 1105. That is, in some examples, the optical component 1112 can include a camera module, including a user-facing camera module that can receive light and/or other forms of electromagnetic radiation passing through an active area of the display assembly 1108.

In some examples, the display assembly 1108 can include an organic light-emitting diode (OLED) display assembly, a micro light-emitting diode (LED) display assembly, or other display technology which enables light from an ambient environment to pass through spaces between the individual pixels of the active area of the display assembly 1108 to be received by a camera module and/or an ambient light sensor of the optical component 1112 contained at least partially in the protrusion 1114. Thus, in some examples, the protrusion can be positioned opposite substantially any region of the active area of the display assembly 1108 and need not be located adjacent or near to a perimeter of the display assembly 1108 and/or display housing 1105. For example, as shown in FIG. 7, the protrusion 1114 can be position at, adjacent to, or opposite a central region of the active area of the display assembly 1108. This configuration can allow for a camera and/or another sensor of the optical component 1112 to be positioned more directly in line with a user's gaze when the user is viewing an image, such as a video of another user, on the display assembly 1108.

Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding optical components and associated protrusions and/or housings, can apply not only to the specific examples discussed herein, but to any number of embodiments in any combination. Various embodiments of electronic devices including components having various features in various arrangements are described below, with reference to FIGS. 8A-8D.

Figure 8A:
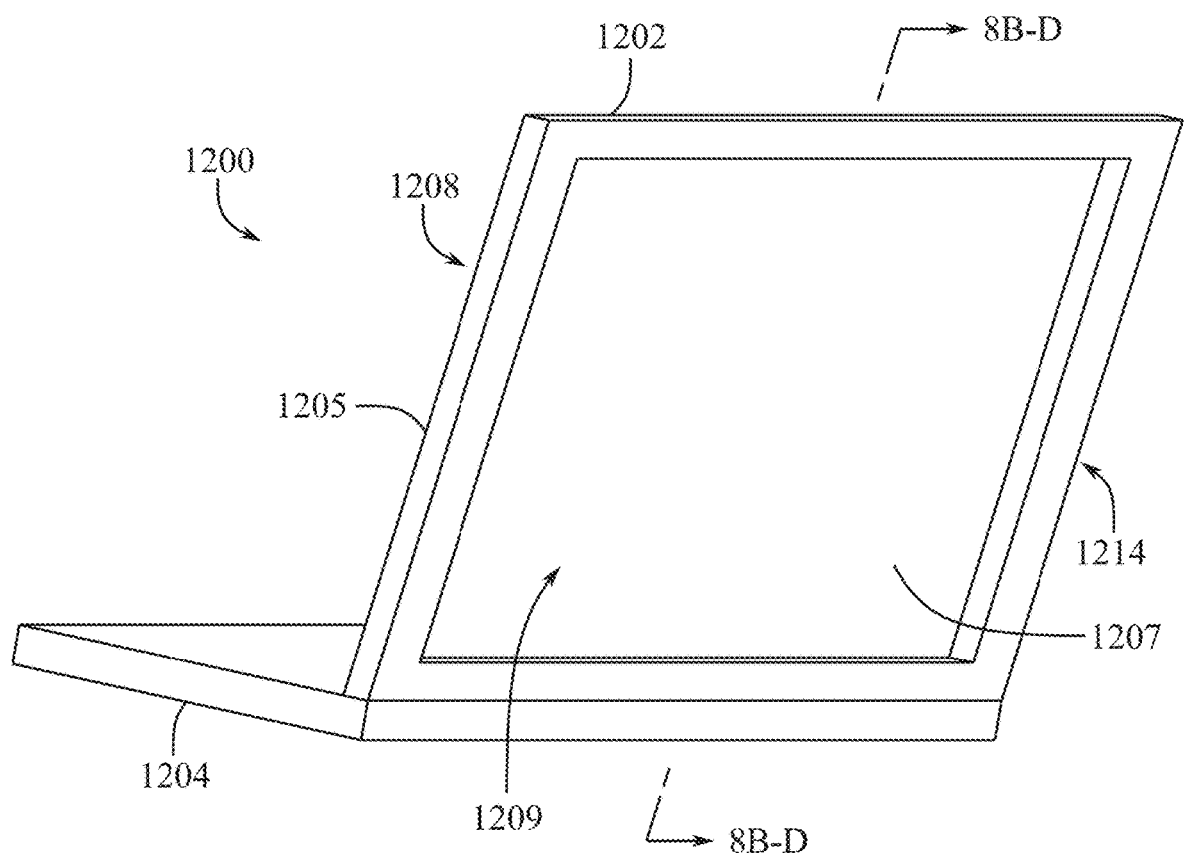
FIG. 8A shows a rear perspective view of an electronic device.

FIG. 8A shows a perspective view of an electronic device 1200 that can be substantially similar to, and can include, some or all of the features of the electronic devices described herein. The electronic device 1200 can include a display portion 1202 that can include a display housing 1205 that can at least partially define an internal volume and a display 1208 that can be at least partially disposed in the internal volume and affixed or secured to the display housing 1205. The device 1200 can also include a base portion 1204, and the base portion 1204 and display portion 1202 can be rotatably or otherwise moveably or removably attached to one another by a connecting component.

In some examples, the display portion housing 1205 can include a protrusion 1214 that can be positioned at or near a perimeter or edge region of the display portion 1202. In some examples, the display portion housing 1205 can include an extended protrusion 1214 that can be positioned opposite an edge region or an active area of the display assembly 1208 of the display portion 1202. In some examples, and as shown, the protrusion 1214 can extend around an entire perimeter of the display portion 1202 and/or display assembly 1208. In some other examples, however, the protrusion 1214 may not extend around the entire periphery and may extend around portions of two or more sides. In some examples, the protrusion may extend around substantially an entire periphery, but may also include multiple separate protrusions such that various section of the periphery may not be adjacent to the protrusion 1214.

In this way, a wall 1207 of the display portion housing 1205 and the protrusion can define a display portion volume 1209 that can be disposed opposite the display assembly 1208 and the aperture containing the display assembly 1208. Additionally, the protrusion 1214 itself can also define another internal volume contained therein and as described further in FIGS. 10B-10D. In some examples, the wall 1207 of the display portion housing 1205 can extend across an entire area of the display portion volume 1209. In some examples, however, the wall 1207 may extend across only a portion of the display portion volume 1209. Further, in some examples, the wall 1207 may not be part of the display portion housing 1205 and may be or include another component of the display portion 1202, such as a surface defined by the display assembly 1208.

Figure 8B:
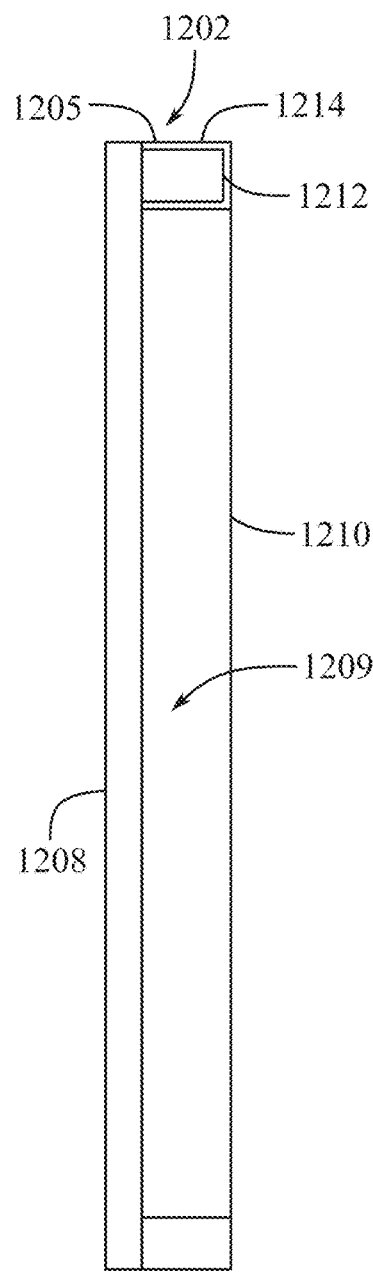
FIG. 8B shows a cross-sectional view of a portion of an electronic device.
Figure 8C:
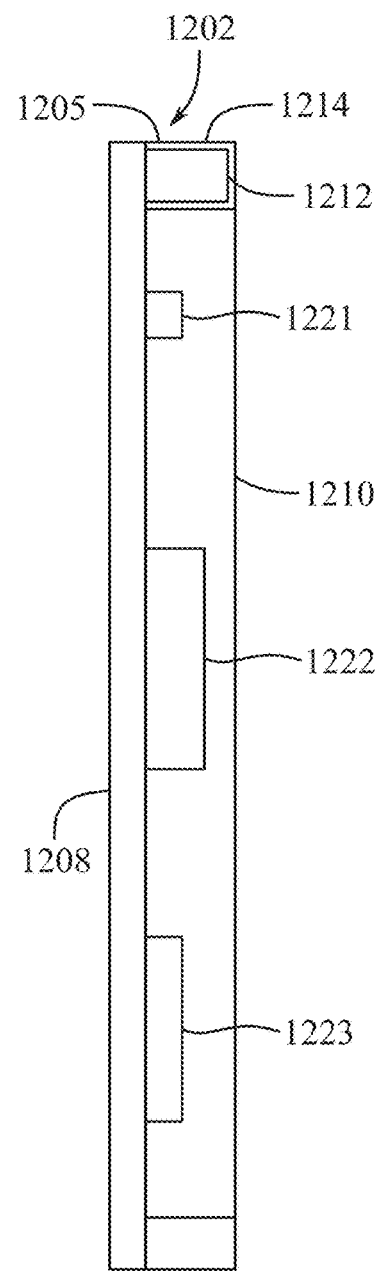
FIG. 8C shows a cross-sectional view of a portion of an electronic device.
Figure 8D:
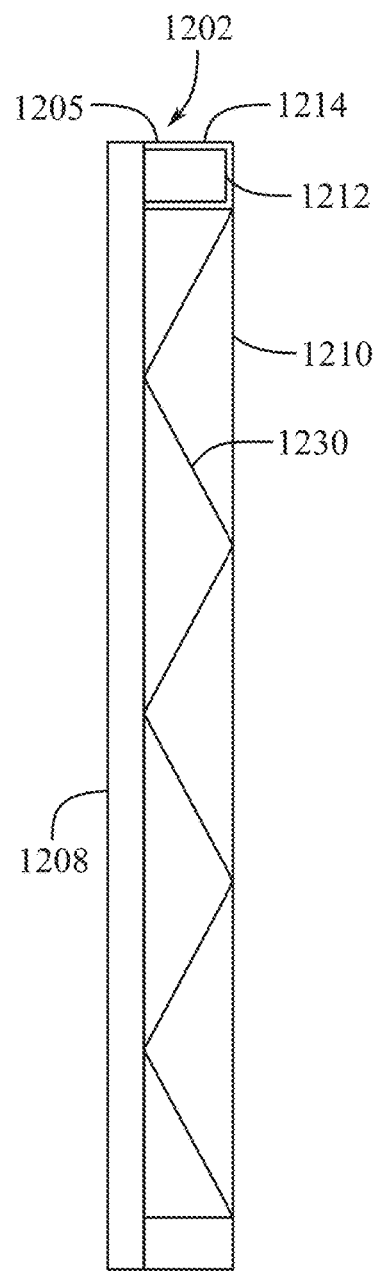
FIG. 8D shows a cross-sectional view of a portion of an electronic device.

FIGS. 8B-8D shows cross-sectional views of the display portion 1202 of the electronic device 1200 of FIG. 8A. In FIG. 8B, the display portion volume 1209 is shown along with the protrusion 1214. As can be seen, an optical component 1212 can positioned in a volume defined by the protrusion 1214, also referred to as a protrusion volume, that is separate from the display portion volume 1209. In some examples, these two volumes may be substantially isolated from one another, such as by one or more parts of the protrusion 1214. In some examples, however, these two volumes may be in communication with one another at one or more various locations, such as through holes in the protrusion 1214, in order to allow power and/or signals to be provided between the components disposed in each volume. Additionally, although not shown in FIG. 8A for illustrative purposes, the display portion volume 1209 can be entirely enclosed by the display portion housing 1205, such as with a wall 1210 that can be joined or connected to the protrusion 1214.

In some examples, and as shown in FIG. 8B, the display portion volume 1209 may not contain any components and may remain substantially empty space, such as to reduce a weight of the device 1200. In some examples, however, and as shown in FIGS. 8C and 8D, one or more components may be disposed in the display portion volume 1209. Thus, these components can be at least partially surrounded by the display portion housing 1205, including the wall 1210, and the protrusion 1214. The components 1221, 1222, 1223 at least partially contained in the display portion volume 1209 can be any components as desired. In some examples, however, the size of the display portion volume 1209 can allow for components that may utilize additional space in order to achieve desired levels of performance. For example, one or more of the components 1221, 1222, 1223 can include an audio component, such as a speaker or actuator. Further, in some examples, the space of the display portion volume 1209 can act as a back volume for a speaker component 1221, 1222, 1223. In some examples, one or more of the components 1221, 1222, 1223 can include a radiating element of an antenna. The radiation element 1221, 1222, 1223 can be shaped or structured as desired in order to optimize antenna performance by utilizing the space provided by the display portion volume 1209. In some examples, the display portion volume 1209 itself can act as an antenna cavity.

As shown in FIG. 8D, in some examples, the component 1230 disposed in the display portion volume 1209 can be a structural component 1230. That is, the component 1230 can provide structural support and/or stiffness to the display portion 1202, for example the wall 1210. In some examples, the structural component 1230 can include any type or form of structural material, as desired, and can include polymeric material, metallic material, ceramic material, and/or combinations or composites thereof. For example, the structural component 1230 can include a structural lattice having a repeating shape. In some examples, the structural component 1230 can include a honeycomb lattice. In some examples, the structural component 1230 can include a metallic lattice that can be infilled with relatively light weight material, such as relatively light weight polymeric material.

Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding optical components and associated protrusions and/or housings, can apply not only to the specific examples discussed herein, but to any number of embodiments in any combination. Various embodiments of electronic devices including components having various features in various arrangements are described below, with reference to FIGS. 9A-10B.

Figure 9A:
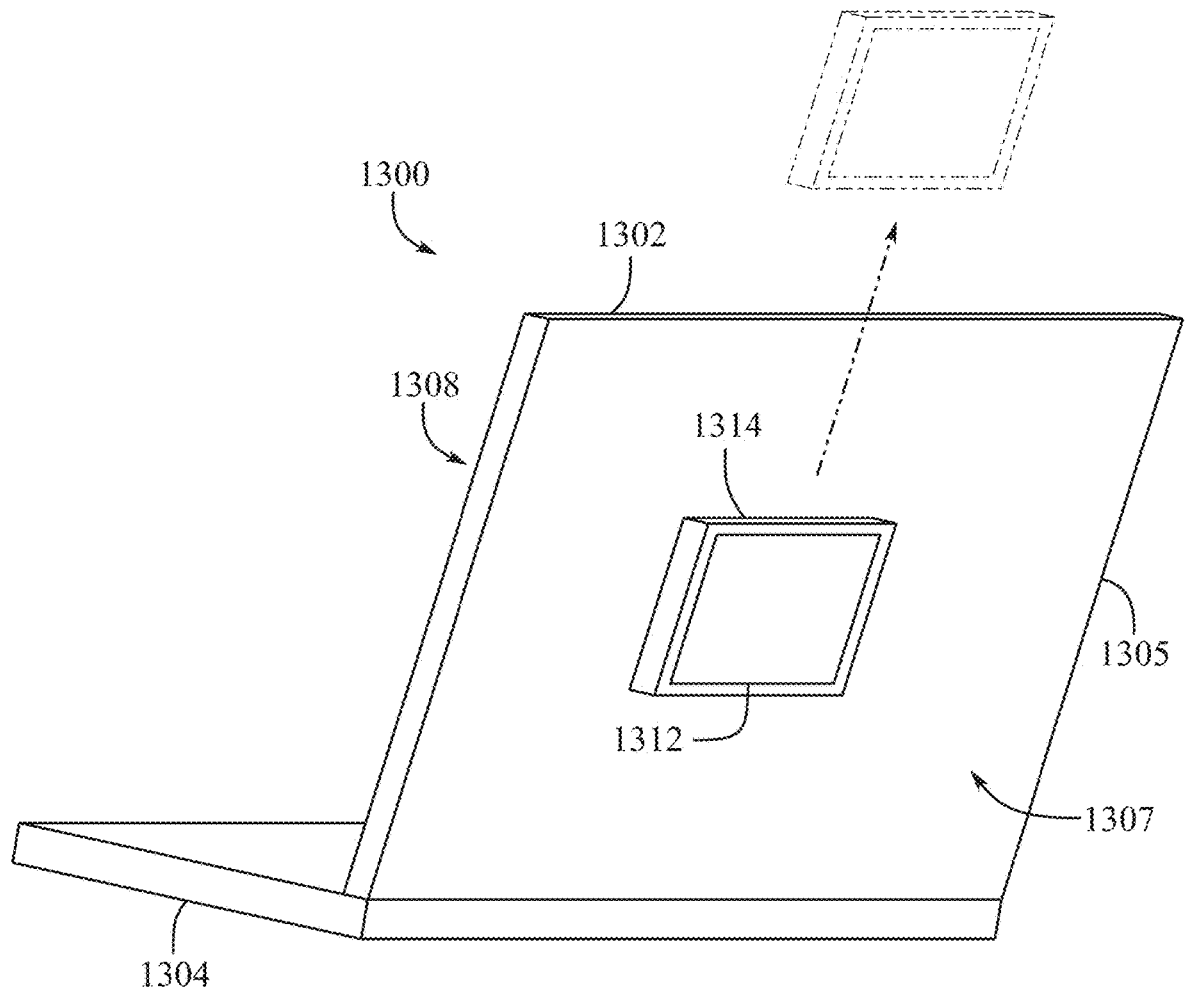
FIG. 9A shows a rear perspective view of an electronic device.

FIG. 9A shows a rear perspective view of an electronic device 1300 that can be substantially similar to, and can include, some or all of the features of the electronic devices described herein. As with those electronic devices, the electronic device 1300 can include a display portion 1302 that can include a display housing 1305 that can at least partially define an internal volume, and a display 1308 that can be at least partially disposed in the internal volume and affixed or secured to the display housing 1305. The device 1300 can also include a base portion 1304, and the base portion 1304 and display portion 1302 can be rotatably or otherwise moveably or removably attached to one another by a connecting component. The display portion housing 1305 can include a wall 1307 that can be positioned opposite the display assembly 1308.

In some examples, the device 1300 can further include an optical component 1312 that can be removably attached to one or more locations on the display portion 1302 and/or base portion 1304. The optical component 1312 can include an optical component housing 1314 that can define an optical component volume in which one or more camera modules or other subcomponents can be at least partially disposed. In some examples, the optical component housing 1314 can have a similar structure to and function in the same manner as any of the protrusions described herein when the optical component 1312 is attached to the display portion 1302.

In some examples, the optical component 1312 can include any or all of the features of the other integrated optical components described herein. Additionally, the removably attachable optical component 1312 can be retained against a desired location or locations on the display portion 1302, such as on the wall 1307 by one or more retention components. These retention components can be contained with the internal volume defined by the display housing 1305, and/or can be present on an exterior of the display portion 1302. In some examples, the optical component 1312 can be magnetically retained against the display portion 1302, such as by the interaction of a magnetic component within the optical component 1312 and a corresponding magnetic retention component of the display portion 1302. In some examples, the retention component can include a ferrous plate. In some examples, as described below, the ferrous plate can be any size and shape as desired and the optical component 1312 can be retained at any location on the ferrous plate. In some examples, the retention component can include one or more magnets, including permanent magnets and/or electromagnets. In some examples, the retention component can include an array of magnets disposed at one or more desired locations.

Figure 9B:
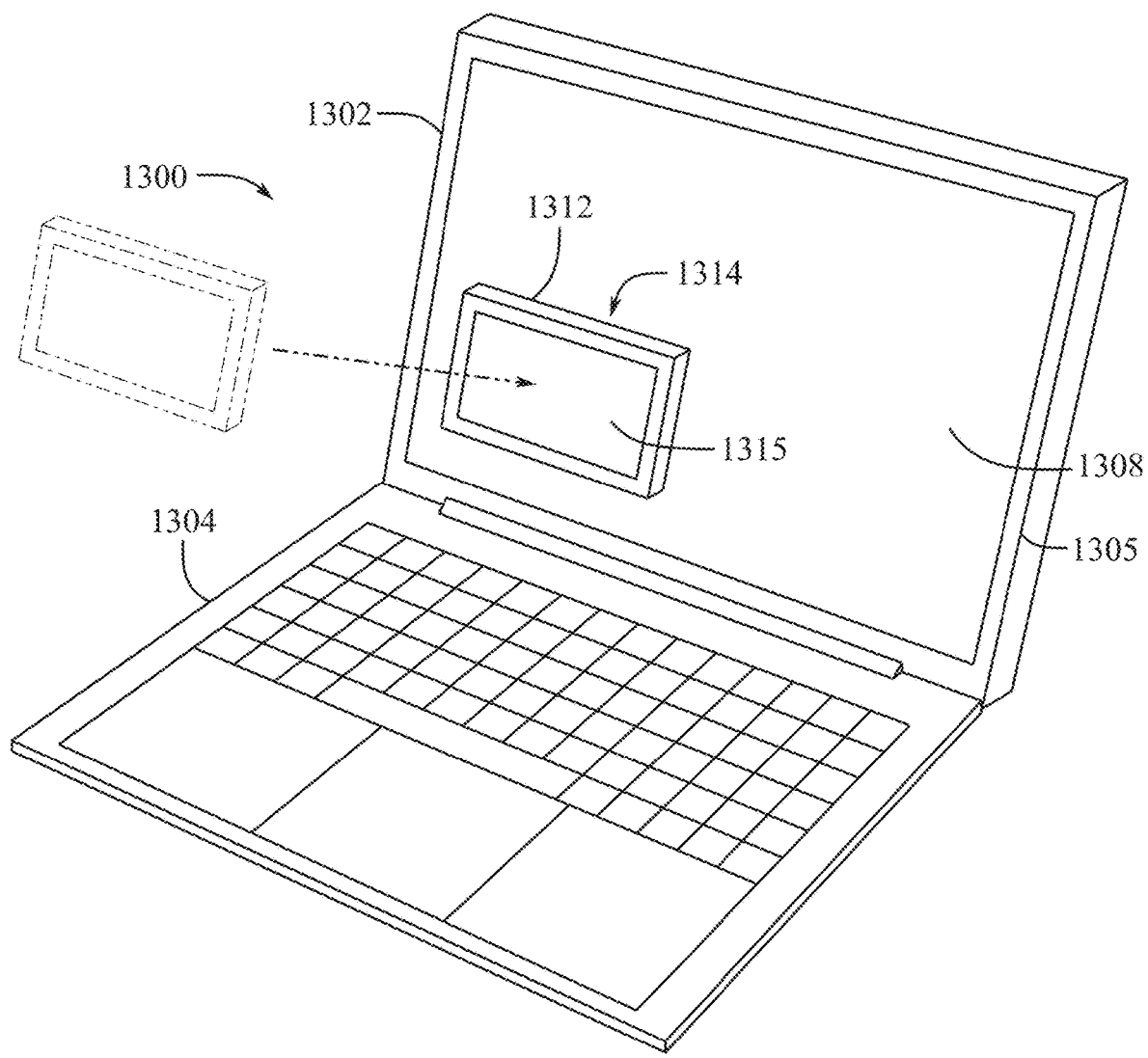
FIG. 9B shows a front perspective view of an electronic device.

FIG. 9B shows a front perspective view of the electronic device 1300 with the optical component 1312 removed from its attachment location on the wall 1307 of the display housing 1305 and removably attached at a desired location at or against the display assembly 1308. In some examples, the optical component 1312 can be removably attached against the display assembly 1308 by the same retention component that removably attached the optical component 1312 to the wall 1307. In some examples, however, a different retention component can removably attach the optical component 1312 to the display assembly 1308.

Further, as can be seen, in some examples the optical component 1312 can include an optical component display assembly 1315. In some examples, when the optical component 1312 is attach to the display assembly 1308, the optical component display assembly 1315 can be positioned so that the optical component display assembly 1315 is parallel to the display assembly 1308 and overlaying at least a portion of the active area of the display assembly 1308. In some examples, the optical component 1312 can include a camera module that can be positioned behind the optical component display assembly 1315 to receive light there through. In this way, when the display assembly 1308 is displaying an image, such as a first image, the optical component display assembly 1315 can be configured to display a second image corresponding to a portion of the first image overlaid by the optical component 1312 when it is retained against the display assembly 1308. This configuration can allow for a user to selectively position a user the optical component 1312, for example a camera module thereof, in any desired manner without the need to permanently reduce an active area of the display assembly 1308.

Figure 10A:
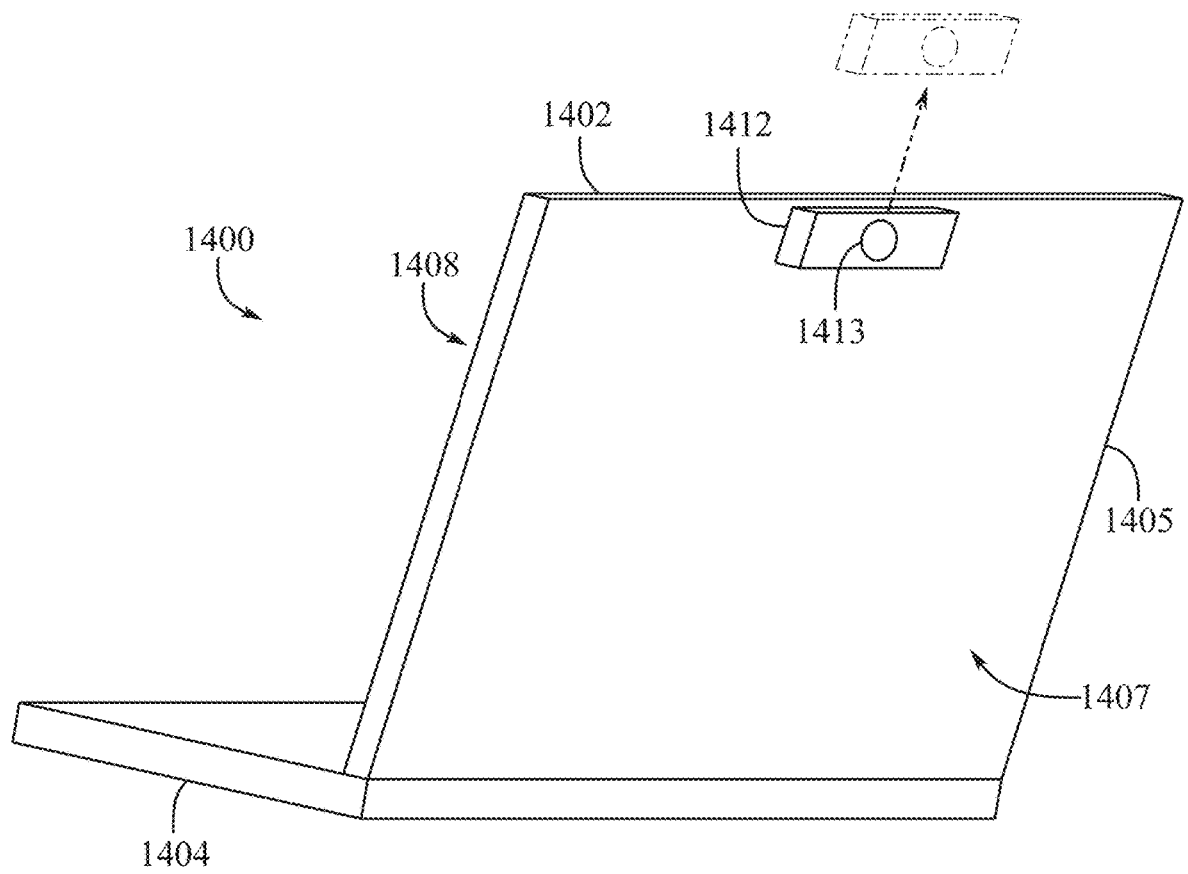
FIG. 10A shows a rear perspective view of an electronic device.

FIG. 10A shows a rear perspective view of an electronic device 1400 that can be substantially similar to and can include some or all of the features of the electronic devices described herein, including the device 1300. The electronic device 1400 can include a display portion 1402 that can include a display housing 1405 that can at least partially define an internal volume and a display 1408 that can be at least partially disposed in the internal volume and affixed or secured to the display housing 1405. The device 1400 can also include a base portion 1404, and the base portion 1404 and display portion 1402 can be rotatably or otherwise moveably or removably attached to one another by a connecting component. The display portion housing 1405 can include a wall 1407 that can be positioned opposite the display assembly 1408.

Figure 10B:
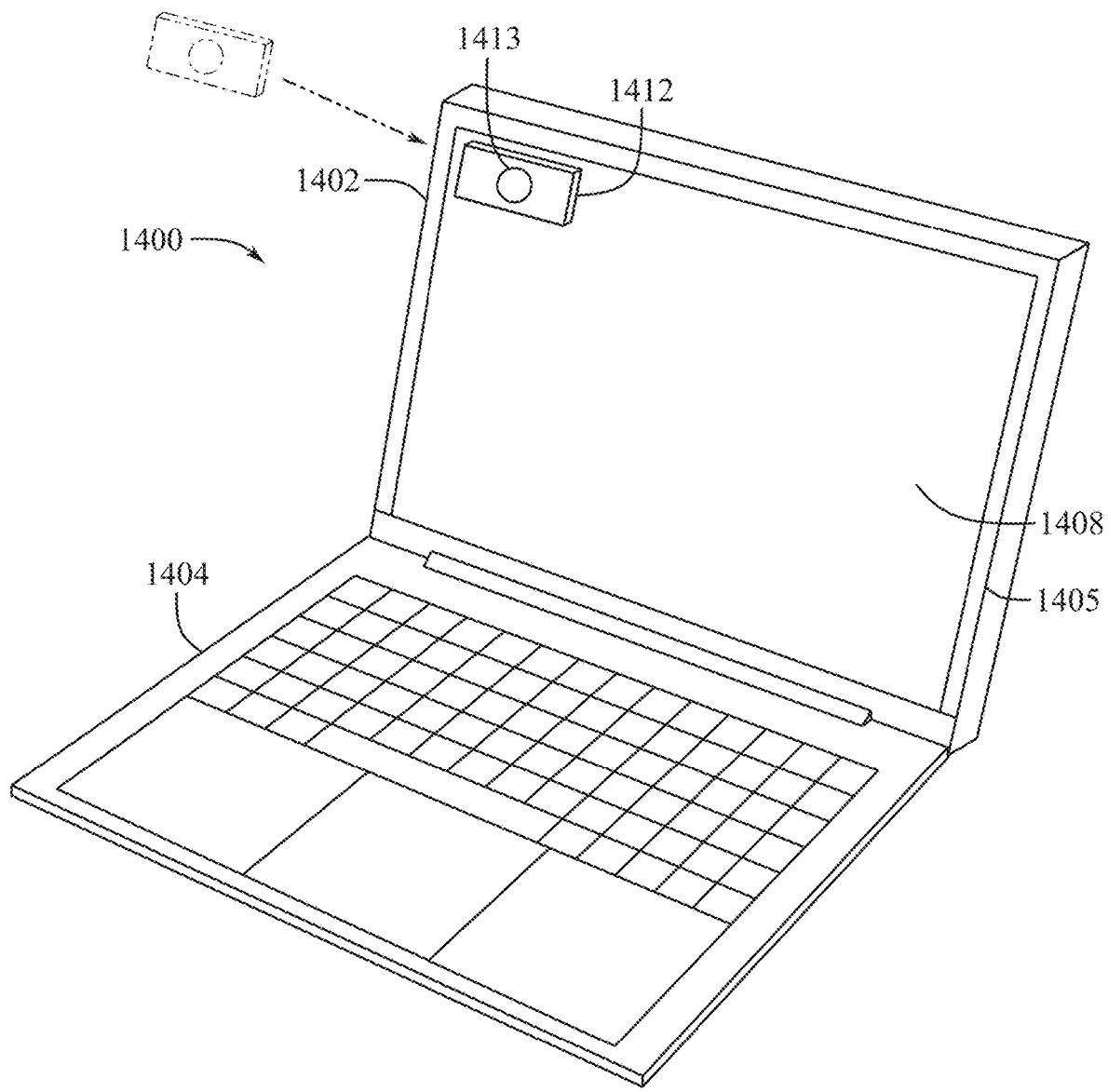
FIG. 10B shows a perspective view of an electronic device.

Similar to the device 1300, the device 1400 can include a removably attachable optical component 1412 that can include a camera module 1413 and that can be the same or similar to any of the optical components described herein. As shown in FIG. 10B, the optical component 1412 can be removably attached to the display assembly 1408, for example, when a user desires the use of a user-facing camera. In some examples, a retention component can allow the optical component 1412 to be positioned at any desired location on the display assembly 1408 or any desired region of the display portion 1402. For example, the display portion 1402 can include a retention component in the form of a ferrous plate that has a similar size as an active area of the display assembly 1408 and the optical component 1412 can be retained against any portion of the active area of the display assembly 1408.

Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding optical components and associated protrusions and/or housings, can apply not only to the specific examples discussed herein, but to any number of embodiments in any combination. Various embodiments of electronic devices including components having various features in various arrangements are described below, with reference to FIGS. 11A-11C.

Figure 11A:
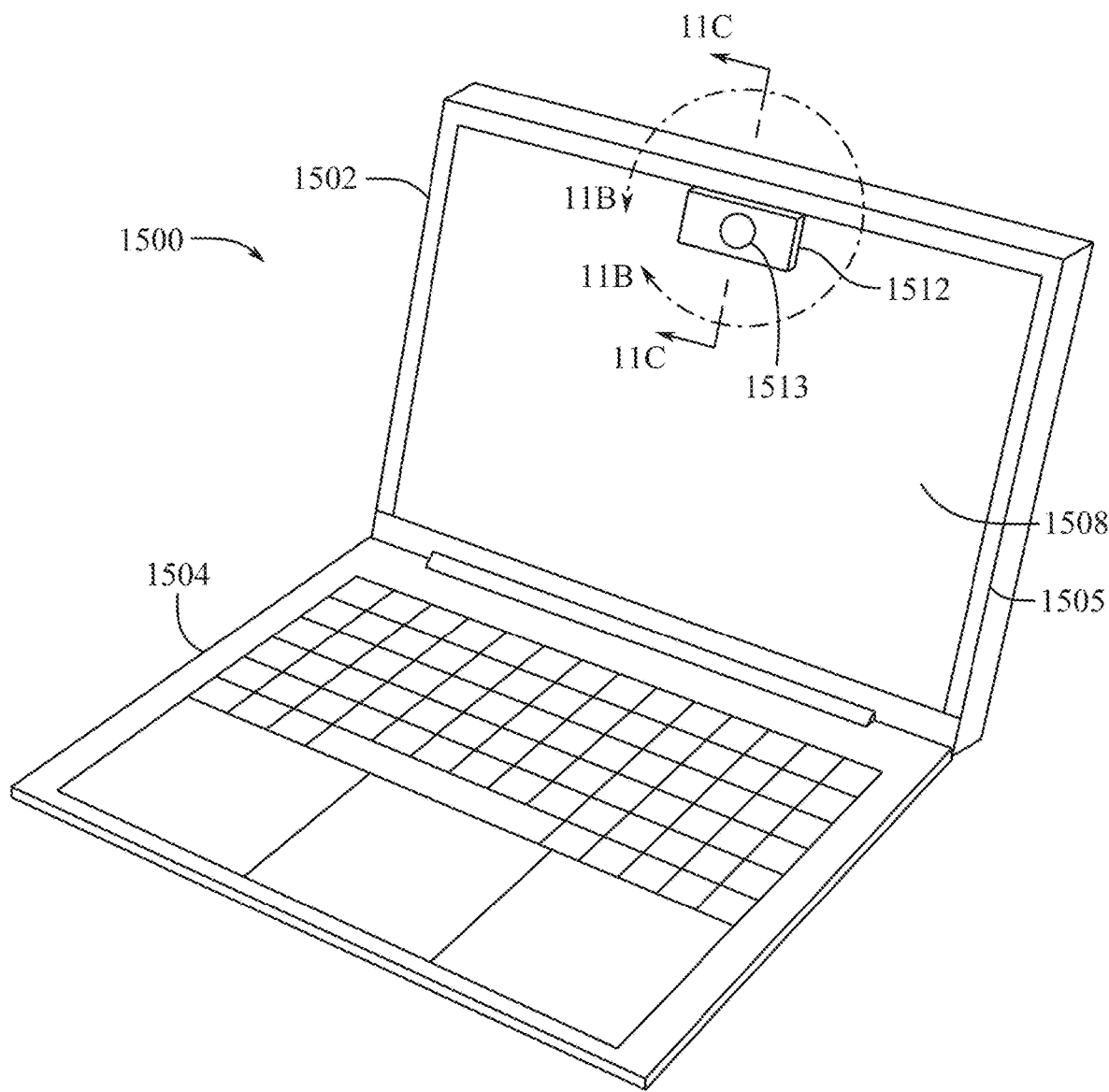
FIG. 11A shows a perspective view of an electronic device.

FIG. 11A shows a perspective view of an electronic device 1500 that can be substantially similar to, and can include, some or all of the features of the electronic devices described herein. The electronic device 1500 can include a display portion 1502 that can include a display housing 1505 that can at least partially define an internal volume and a display 1508 that can be at least partially disposed in the internal volume and affixed or secured to the display housing 1505. The device 1500 can also include a base portion 1504, and the base portion 1504 and display portion 1502 can be rotatably or otherwise moveably or removably attached to one another by a connecting component. The display portion 1502 can include an optical component 1512 that can include some or all of the features of any of the optical components described herein, including removability.

Figure 11B:
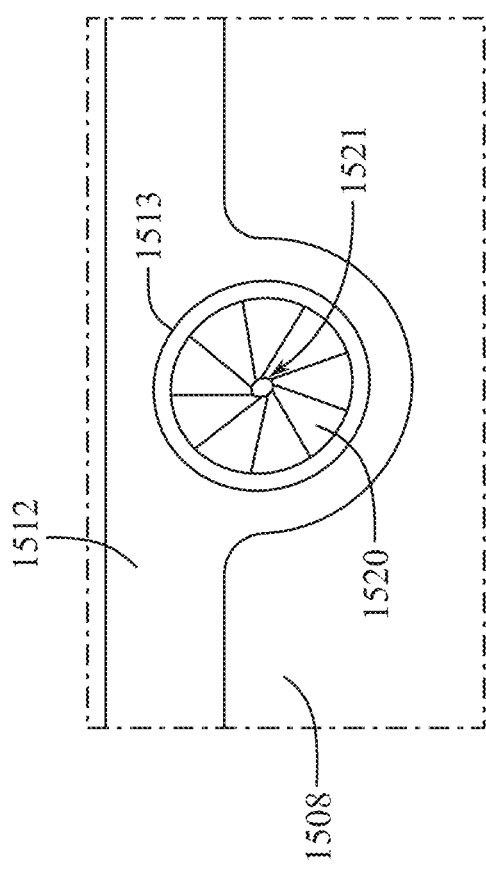
FIG. 11B shows a close-up view of a portion of an electronic device.

FIG. 11B shows a close-up view of the display portion 1502, including the optical component 1512 and the camera module 1513 thereof. As can be seen, in some examples, the optical component 1512 can include a light-blocking component 1520 or shutter that can be used to selectively allow the camera module 1513 to receive light from the ambient environment. In some examples, as shown, the shutter 1520 can include a diaphragm, iris, or leaf shutter 1520 including one or more leaves 1521 that can be moved to allow more, less, or even no light into the camera module 1513. Such a selective light-blocking component 1520 can be used to adjust the exposure of the camera module 1513 and/or to provide privacy when the camera module 1513 and/or optical component 1512 are not in use.

Figure 11C:
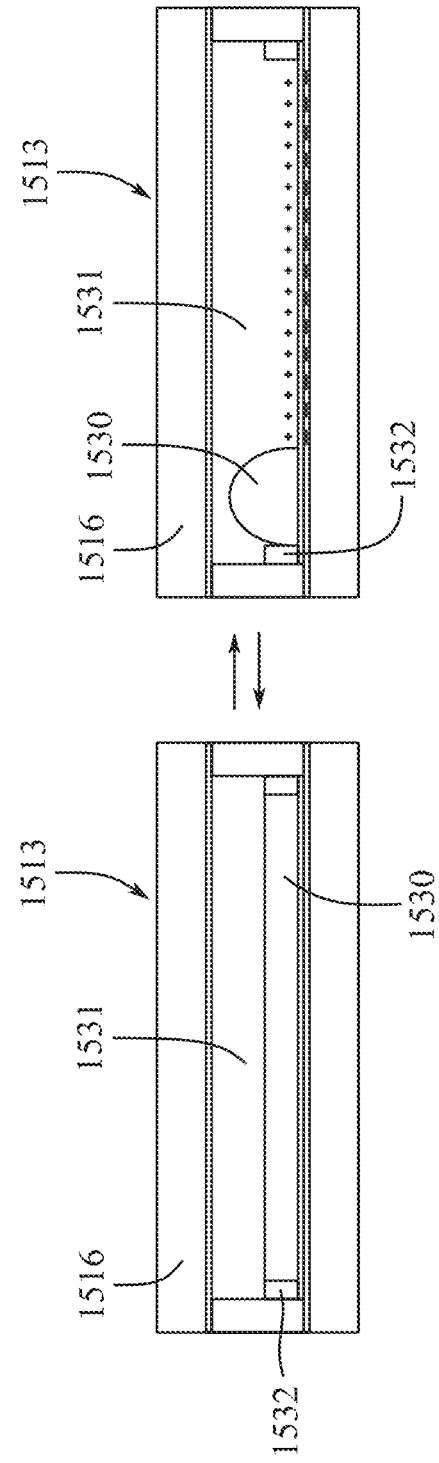
FIG. 11C shows a cross-sectional view of a portion of an electronic device.

FIG. 11C shows an alternative example of a light-blocking component of an optical component 1512 that can be used to selectively allow light to pass to the camera module 1513. The configuration on the left of FIG. 11C is in a light-blocking state, when an opaque material 1530 disposed adjacent to an electrode 1532 in an internal volume defined by a cover 1516. In this light-blocking configuration, the opaque material 1530 extends across an entirety of the lens of the camera module 1513, thereby substantially blocking light from entering. In a light-passing mode, the charge or polarity of the electrode 1532 can be selectively changed to attract the light-blocking material 1530, thereby removing it from occluding the camera module 1513 and allowing light to pass thereto.

Any number or variety of components in any of the configurations described herein can be included in the electronic device. The components can include any combination of the features described herein and can be arranged in any of the various configurations described herein. The structure and arrangement of components of an electronic device having a housing with structures described herein, and defining an internal volume, as well as the concepts regarding optical components, can apply not only to the specific examples discussed herein, but to any number of embodiments in any combination. Various embodiments of electronic devices including components having various features in various arrangements are described below, with reference to FIGS. 12A and 12B.

FIGS. 12A and 12B show views of a display portion 1600 of an electronic device that can be substantially similar to, and can include, some or all of the features of the electronic devices described herein. The display portion 1600 can be substantially similar to any of the display portions described herein, and can include at least a display portion housing 1602 defining an internal volume and an aperture in which a display assembly 1604 can be positioned. In some examples, the display portion 1600 can include a transparent cover layer 1606 that can overlay the display assembly 1604, including an active area thereof. In some examples, the transparent cover layer 1606 can be considered part of the display assembly 1604 and/or the display portion housing 1602. In some examples, the transparent cover layer 1606 can include any desired transparent material, including polymeric material, glass, ceramic, and/or combinations thereof. The transparent cover layer 1606 can substantially occlude, block, or seal the aperture defined by the display portion housing 1602. In some examples, a top or exterior surface of the transparent cover layer 1606 can be flush or even with an exterior surface defined by the display portion housing 1602.

In some examples, the display portion 1600 can include an optical component 1608 having one or more camera modules 1610, 1611 disposed therein. The camera modules 1610, 1611 can be substantially similar to, and can include some or all of the features of, any of the camera modules described herein. In some examples, a cover glass of the optical component 1608 can overlay the one or more camera modules 1610, 1611. The cover glass can be substantially transparent to light and electromagnetic waves. In some examples, the optical component 1608 can bisect a portion of the display assembly 1604 and the display portion housing 1602. In other words, the display assembly 1604 can define a notch or cutaway 1612 and the optical component 1608 can be at least partially disposed within or at the cutaway 1612. In some examples, the optical component 1608 can be wholly disposed within the display portion housing 1602 or wholly disposed within the display assembly 1604. While the camera modules 1610, 1611 depicted in FIGS. 12A and 12B are illustrated as user-facing cameras, in some examples, the optical component 1608 can include one or more camera modules that are additionally, or alternatively, non-user-facing camera modules.

In some examples, the camera module 1610 can have operational parameters, components, or a combination thereof that differ from the operational parameters and/or components of the camera module 1611. For example, the camera module 1610 can be configured to operate at a relatively high frame rate (e.g., more than 20 frames per second) while the camera module 1611 can be configured to operate at a relatively low frame rate (e.g., less than 10 frames per second). After each of the camera modules 1610, 1611 have collected respective image data, the image data can be combined or selectively overlaid to generate a higher quality image than either camera module could produce individually. For example, a computing device can utilize machine learning techniques to combine the respective image data to produce a high-quality image. One benefit of combining the image data from two or more camera modules is that the overall thickness or depth of each camera module can be reduced without lessening the quality of the image available to a user of the device. For example, the thickness of each camera module 1610, 1611 can be about 3 mm, between about 3 mm and about 2 mm, or less than about 2 mm. Moreover, a reduction to the depth or thickness of the respective camera modules also enables a reduction in the thickness of the display portion housing 1602. For example, each of the camera modules 1610, 1611 can be disposed within the display portion housing 1602 without requiring a protrusion (e.g., protrusion 814) formed within the display portion housing 1602.

In some examples, the camera modules 1610, 1611 are collocated to simplify the process of combining or overlaying the respective image data of each camera module 1610, 1611. By collocating the camera modules 1610, 1611, each lens of each camera module has substantially the same perspective of the environment external to the electronic device to minimize errors resultant from parallax. For example, the camera module 1610 can be disposed adjacent or substantially adjacent the camera module 1611 such that the field of view or perspective of the camera module 1610 is substantially similar to a field of view or perspective of the camera module 1611.

In some examples, the camera module 1610 can be disposed in a different optical component than the camera module 1611 such that the field of view or perspective of each camera module 1610, 1611 is different. One benefit of positioning each camera module in a different location is a first camera module can be disposed in a section of the display portion housing 1602 that is larger or thicker to accommodate a larger camera module (e.g., more lenses, larger focal lengths, etc.) while the second camera can be disposed in a section of the display portion housing 1602 that is relatively smaller or thinner. Consequently, the second camera module can be smaller or thinner than the first camera module but the image data captured by the first and second camera modules can still be combined or overlaid to generate a high quality image despite the disadvantages inherent in utilizing the thinner or smaller second camera module. In other words, if disposed in separate locations, the first and second camera modules can be different sizes such that the larger or thicker camera module can at least partially make up for the deficiencies inherent in the smaller or thinner camera module.

Any number or variety of components in any of the configurations described herein can be included in the electronic device. The components can include any combination of the features described herein, and can be arranged in any of the various configurations described herein. The structure and arrangement of components of an electronic device having a housing with structures described herein, and defining an internal volume, as well as the concepts regarding optical components, can apply not only to the specific examples discussed herein, but to any number of embodiments in any combination. Various embodiments of electronic devices including components having various features in various arrangements are described below, with reference to FIGS. 13A and 13B.

FIGS. 13A and 13B show views of a display portion 1700 of an electronic device that can be substantially similar to, and can include, some or all of the features of the electronic devices described herein. The display portion 1700 can be substantially similar to any of the display portions described herein, and can include at least a display portion housing 1702 defining an internal volume and an aperture in which a display assembly 1704 can be positioned. In some examples, the display portion 1700 can include a transparent cover layer 1706 that can overlay the display assembly 1704, including an active area thereof. In some examples, the transparent cover layer 1706 can be considered part of the display assembly 1704 and/or the display portion housing 1702. In some examples, the transparent cover layer 1706 can include any desired transparent material, including polymeric material, glass, ceramic, and/or combinations thereof. The transparent cover layer 1706 can substantially occlude, block, or seal the aperture defined by the display portion housing 1702. In some examples, a top or exterior surface of the transparent cover layer 1706 can be flush or even with an exterior surface defined by the display portion housing 1702.

In some examples, the display portion 1700 can include one or more camera modules 1710, 1711 disposed within the display housing portion 1702 and underneath an active area of the display assembly 1704. The camera modules 1710, 1711 can be substantially similar to, and can include some or all of, the features of any of the camera modules described herein. In some examples, the display assembly 1704 can include an organic light-emitting diode (OLED) display assembly, a micro light-emitting diode (LED) display assembly, or another display technology which enables light from an ambient environment to pass through spaces between the individual pixels of the active area of the display assembly 1704 to be received by the one or more camera modules 1710, 1711 and/or an ambient light sensor (not shown) disposed within the display housing portion 1702 and underneath an active area of the display assembly 1704. This configuration can allow for the one or more camera modules 1710, 1711 and/or other sensors disposed within the display portion 1700 to be positioned more directly in line with a user's gaze when the user is viewing an image, such as a video of another user, on the display assembly 1704.

In some examples, the camera module 1710 can have operational parameters, components, or a combination thereof that differ from the operational parameters and/or components of the camera module 1711. For example, the camera module 1710 can be configured to operate at a relatively high frame rate (e.g., more than 20 frames per second) while the camera module 1711 can be configured to operate at a relatively low frame rate (e.g., less than 10 frames per second). After each of the camera modules 1710, 1711 have collected respective image data, the image data can be combined or selectively overlaid to generate a higher quality image than either camera module could produce individually. For example, a computing device can utilize machine learning techniques to selectively combine the respective image data to produce a high quality image. One benefit of combining or overlaying the image data from two or more camera modules is the thickness or depth of each camera module can be reduced without lessening the quality of the image available to a user of the device. For example, the thickness of each camera module 1710, 1711 can be about 3 mm, between about 3 mm and about 2 mm, or less than about 2 mm. Moreover, a reduction to the depth or thickness of the respective camera modules also enables a reduction in the thickness of the display portion housing 1702. For example, each of the camera modules 1710, 1711 can be disposed within the display portion housing 1702 without requiring a protrusion (e.g., protrusion 814) formed within the display portion housing 1702.

In some examples, the camera modules 1710, 1711 are collocated to simplify the process of combining the respective image data of each camera module 1710, 1711. By collocating the camera modules 1710, 1711, each lens of each camera module has substantially the same perspective of the environment external to the electronic device to minimize errors resultant from parallax. For example, the camera module 1710 can be disposed adjacent or substantially adjacent the camera module 1711 such that the field of view or perspective of the camera module 1710 is substantially similar to a field of view or perspective of the camera module 1711.

In some examples, the camera module 1710 can be disposed at a different location behind the active area of the display assembly 1704 than the camera module 1711 such that the field of view or perspective of each camera module 1710, 1711 is different. In other words, the camera modules 1710, 1711 may not be collocated in some examples. One benefit of positioning each camera module in a different location is a first camera module can be disposed behind the display assembly 1704 in a section of the display portion housing 1702 that is larger or thicker to accommodate a larger camera module (e.g., more lenses, larger focal lengths, etc.) while the second camera can be disposed behind the display assembly 1704 in a section of the display portion housing 1602 that is relatively smaller or thinner. Consequently, the second camera module can be smaller or thinner than the first camera module but the image data captured by the first and second camera modules can still be combined to generate a high quality image despite the disadvantages inherent in utilizing the thinner or smaller second camera module. In other words, if disposed in separate location, the first and second camera modules can be different sizes such that the larger or thicker camera module can at least partially make up for the deficiencies inherent in the smaller or thinner camera module. Additionally, with regard to the non-collocated cameras, the use of machine learning to combine or selectively overlay the resulting images to generate an improved composite image can adjust for the known location of each camera and can adjust the composite image accordingly.

While the present disclosure generally describes components and features of a display portion of an electronic device, the components and features described herein can be used in any combination or order and with any desired component or electronic device. Further, the components and features can assume any geometric shape, pattern, size, or combination of shapes, patterns, and sizes. Additionally, the features described herein can be positioned on or extend from any surface or surfaces of any desired housing and/or components.

Any of the features or aspects of the computing devices discussed herein can be combined or included in any combination. For example, a computing device can include a base and one or more displays and/or keyboard attached thereto. The one or more displays and/or keyboard can be rotatable relative to the base and removably attached to one or more retaining portions. Further, the components of the computing devices described herein, including components that can be fully or partially removable, can be housed entirely within an internal volume. For example, an internal volume defined by the base.

Any of the features or aspects of the computing devices discussed herein can be combined or included in any combination. For example, a computing device can include a coupling mechanism and one or more displays and/or keyboard attached thereto. The one or more displays and/or keyboard can be rotatable relative to the coupling mechanism and removably attached to one or more retaining portions. Further, the components of the computing devices described herein, including components that can be fully or partially removable, can be housed entirely within an internal volume. For example, an internal volume defined by the intermediate portion of the coupling mechanism.

To the extent applicable to the present technology, gathering and use of data available from various sources can be used to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data can be used to provide insights into a user's general wellness, or can be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not target to be exhaustive or to limit the examples to the precise forms disclosed. It will be apparent to one of ordinary skill in the art that many modifications and variations are possible in view of the above teachings.

What is claimed is:

1. A portable electronic device, comprising:
   a housing comprising a wall defining an external surface and a plane, the housing defining an aperture disposed opposite the wall, the external surface comprising:
      a first region defining a first exterior surface of the external surface; and
      a second region protruding from the first exterior surface away from the plane defined by the wall;
   a display assembly positioned at the aperture; and
   one or more camera modules positioned in an internal volume defined by the second region.

2. The portable electronic device of claim 1, wherein the one or more camera modules comprises a first camera module and a second camera module positioned within the internal volume, further comprising:
   a processor disposed within the housing, the processor electrically connected to the first camera module and the second camera module, the processor configured to:
   receive a first set of image data from the first camera module;
   receive a second set of image data from the second camera module; and
   combine the first set of image data and the second set of image data to generate a third set of image data.

3. The portable electronic device of claim 2, wherein the first camera module is configured to operate at a frame rate different from a frame rate of the second camera.

4. The portable electronic device of claim 2, wherein an overall thickness of the first camera module is different from an overall thickness of the second camera module.

5. The portable electronic device of claim 2, wherein the first camera module corresponds to a first focal length or a first range of focal lengths, and wherein the second camera module corresponds to a second focal length different from the first focal length or a second range of focal lengths different from the second range of focal lengths.

6. The portable electronic device of claim 2, wherein the first set of image data and the second set of image data are combined using machine learning techniques.

7. The portable electronic device of claim 1, further comprising an optical component, wherein the one or more camera modules are collocated within the optical component.

8. The portable electronic device of claim 1, further comprising one or more sensor modules positioned in an internal volume defined by the second region.

9. The portable electronic device of claim 8, further comprising an optical component, wherein the one or more sensor modules are collocated with the one or more camera modules within the optical component.

10. A portable electronic device, comprising:
    a base portion comprising an input component; and a display portion rotatably attached to the base portion, the display portion comprising:
  a housing comprising an external wall and a protrusion from the external wall, the protrusion defining a recess;
  a display assembly mounted to the housing;
  a camera module positioned in the recess defined by the protrusion; and
  one or more components positioned within an internal volume defined by the housing, the one or more components comprising a processor and a second camera module,
  wherein the processor is configured to:
    receive a first set of image data from the first camera module;
    receive a second set of image data from the second camera module; and
    combine the first set of image data and the second set of image data to generate a third set of image data with higher quality that the first set of image data and the second set of image data.

11. The portable electronic device of claim 10, wherein the one or more components comprise at least one of a sensor module or an emitter module.

12. The portable electronic device of claim 11, wherein the second camera module is positioned opposite of the external wall and facing a different direction than the camera module positioned in the recess defined by the protrusion.

13. The portable electronic device of claim 10, further comprising an optical component that includes the camera module and the one or more components.

14. The portable electronic device of claim 10, wherein the display assembly comprises either an organic light-emitting diode (OLED) display panel or an array of micro light emitting diodes (LEDs).

15. A portable electronic device, comprising:
  a base portion comprising an input component; and
  a display portion rotatably attached to the base portion, the display portion comprising:
    a housing comprising a back cover positioned opposite an aperture defined by the housing, the back cover comprising:
      a first region defining a first exterior surface of the display portion; and
      a protrusion extending from the first region;
    a display assembly positioned at the aperture, the display assembly defining an active area; and
    an optical component positioned behind the display assembly in an internal volume defined by the protrusion, wherein the optical module is positioned to receive light through the active area.

16. The portable electronic device of claim 15, wherein the optical component comprises a camera module positioned adjacent to the active area.

17. The portable electronic device of claim 15, wherein the optical component further comprises a sensor module positioned to detect a property of an ambient environment.

18. The portable electronic device of claim 17, wherein the sensor module is positioned in the protrusion.

19. The portable electronic device of claim 15, wherein the protrusion from the first region is positioned adjacent to a central region of the active area defined by the display assembly.

* * * * *